(12) United States Patent
Burkart et al.

(10) Patent No.: US 8,456,282 B2
(45) Date of Patent: Jun. 4, 2013

(54) SYNCHRONIZATION OF DEVICES IN A RFID COMMUNICATIONS ENVIRONMENT

(75) Inventors: Scott M. Burkart, Royse City, TX (US); Jonathan E. Brown, Farmersville, TX (US)

(73) Assignee: L-3 Communications Integrated Systems L.P., Greenville, TX (US)

(*) Notice: Subject to any disclaimer, the term of this patent is extended or adjusted under 35 U.S.C. 154(b) by 963 days.

(21) Appl. No.: 12/387,463

(22) Filed: May 1, 2009

(65) Prior Publication Data

US 2010/0277286 A1 Nov. 4, 2010

(51) Int. Cl.
*H04Q 5/22* (2006.01)

(52) U.S. Cl.
USPC .................................. 340/10.34

(58) Field of Classification Search
USPC ................ 340/10.34, 10.31, 10.33, 10.41
See application file for complete search history.

(56) References Cited

U.S. PATENT DOCUMENTS

| | | |
|---|---|---|
| 4,656,463 A | 4/1987 | Anders et al. |
| 4,813,057 A | 3/1989 | Fullerton |
| 5,469,409 A | 11/1995 | Anderson et al. |
| 5,510,800 A | 4/1996 | McEwan |
| 5,661,490 A | 8/1997 | McEwan |
| 5,726,630 A | 3/1998 | Marsh et al. |
| 5,745,049 A | 4/1998 | Akiyama et al. |
| 5,748,891 A | 5/1998 | Fleming et al. |
| 5,774,876 A | 6/1998 | Woolley et al. |
| 6,002,708 A | 12/1999 | Fleming et al. |
| 6,038,616 A | 3/2000 | Thornton et al. |
| 6,054,950 A | 4/2000 | Fontana |
| 6,104,333 A * | 8/2000 | Wood, Jr. .................. 341/173 |
| 6,111,536 A | 8/2000 | Richards et al. |
| 6,133,876 A | 10/2000 | Fullerton et al. |
| 6,295,019 B1 | 9/2001 | Richards et al. |
| 6,300,903 B1 | 10/2001 | Richards et al. |
| 6,380,894 B1 | 4/2002 | Boyd et al. |
| 6,385,268 B1 | 5/2002 | Fleming et al. |
| 6,400,754 B2 | 6/2002 | Fleming et al. |
| 6,420,961 B1 | 7/2002 | Bates et al. |
| 6,466,125 B1 | 10/2002 | Richards et al. |
| 6,466,168 B1 | 10/2002 | McEwan |

(Continued)

OTHER PUBLICATIONS

Brown et al., "Data Separation in High Density Environments", U.S. Appl. No. 12/387,485, Amendment, Jun. 21, 2012, 27 pgs.

(Continued)

*Primary Examiner* — Vernal Brown
(74) *Attorney, Agent, or Firm* — O'Keefe, Egan, Peterman & Enders LLP

(57) ABSTRACT

An adaptive wakeup methodology may be implemented to allow an radio frequency identification (RFID) tag to stay synchronized with periodic radio frequency (RF) interrogator polling signal while at the same time optimizing power consumption. A receiver (or transceiver) component of a RFID tag may only be operated when an interrogator polling signal is expected, and in a manner that reduces the amount of time between when the receiver or transceiver is turned on and when the interrogator polling signal is received (i.e., the receive buffer time). At other times, the RFID tag may be placed in a low power consumption sleep state. The amount of time that the RFID tag spends in such a low power sleep state before waking and receiving the following interrogator polling signal may also be optionally adjusted, e.g., to fit characteristics of a given situation and/or to re-synchronize a given aRFID tag with first band transmissions from an aRFIDI.

26 Claims, 8 Drawing Sheets

U.S. PATENT DOCUMENTS

| | | | |
|---|---|---|---|
| 6,469,628 | B1 | 10/2002 | Richards et al. |
| 6,483,461 | B1 | 11/2002 | Matheney et al. |
| 6,489,893 | B1 | 12/2002 | Richards et al. |
| 6,492,904 | B2 | 12/2002 | Richards |
| 6,501,393 | B1 | 12/2002 | Richards et al. |
| 6,512,455 | B2 | 1/2003 | Finn et al. |
| 6,542,114 | B1 * | 4/2003 | Eagleson et al. ......... 342/357.25 |
| 6,600,418 | B2 | 7/2003 | Francis et al. |
| 6,611,234 | B2 | 8/2003 | Fullerton et al. |
| 6,661,342 | B2 | 12/2003 | Hall et al. |
| 6,674,396 | B2 | 1/2004 | Richards et al. |
| 6,690,741 | B1 | 2/2004 | Larrick, Jr. et al. |
| 6,700,538 | B1 | 3/2004 | Richards |
| 6,750,757 | B1 | 6/2004 | Gabig, Jr. et al. |
| 6,795,491 | B2 | 9/2004 | Fleming et al. |
| 6,812,884 | B2 | 11/2004 | Richley et al. |
| 6,882,315 | B2 | 4/2005 | Richley et al. |
| 6,886,055 | B2 | 4/2005 | Heller et al. |
| 6,900,732 | B2 | 5/2005 | Richards et al. |
| 6,989,751 | B2 | 1/2006 | Richards |
| 7,009,515 | B2 | 3/2006 | Carrender |
| 7,015,793 | B2 | 3/2006 | Gabig, Jr. et al. |
| 7,023,342 | B2 | 4/2006 | Corbett et al. |
| 7,046,716 | B1 | 5/2006 | Miao |
| 7,151,490 | B2 | 12/2006 | Richards |
| 7,170,408 | B2 | 1/2007 | Taylor et al. |
| RE39,759 | E | 8/2007 | Fullerton |
| 7,372,403 | B2 | 5/2008 | Fullerton et al. |
| 7,383,053 | B2 | 6/2008 | Kent et al. |
| 7,397,379 | B2 | 7/2008 | Richards et al. |
| 7,405,658 | B2 | 7/2008 | Richards |
| 7,474,219 | B2 | 1/2009 | Richards et al. |
| 7,492,316 | B1 | 2/2009 | Ameti et al. |
| 7,495,558 | B2 | 2/2009 | Pope et al. |
| 7,667,575 | B2 | 2/2010 | Husak et al. |
| 7,714,780 | B2 | 5/2010 | Rofougaran |
| 7,872,567 | B2 | 1/2011 | Friedrich |
| 7,982,585 | B2 * | 7/2011 | Zai et al. ..................... 340/10.1 |
| 8,072,311 | B2 | 12/2011 | Sadr et al. |
| 2001/0030625 | A1 | 10/2001 | Doles et al. |
| 2002/0030596 | A1 | 3/2002 | Finn et al. |
| 2005/0104715 | A1 | 5/2005 | Farrell |
| 2005/0111346 | A1 | 5/2005 | Santhoff et al. |
| 2005/0275527 | A1 | 12/2005 | Kates |
| 2006/0103533 | A1 * | 5/2006 | Pahlavan et al. ........... 340/572.1 |
| 2006/0114102 | A1 | 6/2006 | Chang et al. |
| 2007/0069861 | A1 | 3/2007 | Reunamaki |
| 2008/0150698 | A1 | 6/2008 | Smith et al. |
| 2009/0189739 | A1 | 7/2009 | Wang |
| 2010/0277248 | A1 | 11/2010 | McClain, Jr. et al. |
| 2010/0277280 | A1 | 11/2010 | Burkart et al. |
| 2010/0277283 | A1 | 11/2010 | Burkart et al. |
| 2010/0277284 | A1 | 11/2010 | Brown et al. |
| 2010/0277285 | A1 | 11/2010 | Anderson et al. |
| 2010/0277286 | A1 | 11/2010 | Burkart et al. |
| 2010/0278214 | A1 | 11/2010 | Westcott et al. |
| 2010/0279745 | A1 | 11/2010 | Westcott et al. |

OTHER PUBLICATIONS

Time Domain, "Location Software", Available prior to May 1, 2009 filing date of the current application, 3 pgs.
Time Domain, "Plus Synchronization Distribution Panel", Available prior to May 1, 2009 filing date of the current application, 3 pgs.
Time Domain, "Plus Small Form Factor Antennas", Available prior to May 1, 2009 filing date of the current application, 4 pgs.
Time Domain, "Plus Antennas", Available prior to May 1, 2009 filing date of the current application, 6 pgs.
Time Domain, "Plus Badge Tag", Available prior to May 1, 2009 filing date of the current application, 3 pgs.
Time Domain, "Plus Reader", Available prior to May 1, 2009 filing date of the current application, 3 pgs.
Time Domain, "Plus Asset Tag", Available prior to May 1, 2009 filing date of the current application, 4 pgs.
Time Domain, "Plus OEM Tag", Available prior to May 1, 2009 filing date of the current application, 4 pgs.
EDN, "Ultrawideband: An Electonic Free Lunch", Dec. 21, 2000, 3 pgs.
"Mad Scramble for Electronic Livestock Tracking", Available prior to May 1, 2009 filing date of the current application, 2 pgs.
Corry Micronics, "Wisair Joins TI in Offering Royalty Free UWB License", Dec. 9, 2003, 1 pg.
Multispectral, "Multispectral Solutions", Available prior to May 1, 2009 filing date of the current application, 2 pgs.
Multispectral, "Sapphire Vision Reader", 2008, 3 pgs.
Multispectral, "Sapphire Dart", 2008, 2 pgs.
Fontana et al., "Commercialization of an Ultra Wideband Precision Asset Location System" IEEE Conference on Wideband Systems and Technologies, Nov. 2003, 6 pgs.
Frost & Sullivan, "Award Category: Product Innovation of the Year", 2005, 3 pgs.
Pahlavan, "Trends in RF Location Sensing", Auto-ID Laboratory at MIT, RFID Academic Convocation, Jan. 23, 2006, 22 pgs.
Duckworth, GPS Free Navigation, Darpa, "Bridging the Gap", Available prior to May 1, 2009 filing date of the current application; 7 pgs.
Darpa, Robust Surface Navigation (RSN), Available prior to May 1, 2009 filing date of the current application, 2 pgs.
Darpa, "Surface Navigatino Concept-without GPS", Apr. 19, 2007, 5 pgs.
"A Robust Surface Navigation (RSN) Program", May 6, 2005, 3 pgs.
Robust Surface Navigation (RSN), Jun. 24, 2005, 4 pgs.
Fontana, "Recent System Applications for Short-Pulse Ultra-Wideband (UWB) Technology", IEEE Microwave Theory and Tech., vol. 52, No. 9, Sep. 2004, 19 pgs.
Ubisense, "System Overview", 2007, 4 pgs.
Multispectral Solutions, "Precision Real Time Location & Tracking for Demanding Industrial Environment", 2007, 3 pgs.
Multispectral Solutions, "Radio Frequency Identification (RFID) Has Taken a New Leap Forward", 2007, 2 pgs.
Wikipedia, "Multilateration", Available prior to May 1, 2009 filing date of the current application, 6 pgs.
Ubisense, Ubisense Slim Tag:, 2007, 1 pg.
Nekoogar et al., "Self Organization of Wireless Sensor Networks Using Ultra-Wideband Radios", IEEE, 2004, 4 pgs.
Dowla et al., "Multiple Access in Ultra-Wideband Communications Using Multiple Pulses and the Use of Least Squares Filters", IEEE, 2003, 4 pgs.
Mills et al., "Noncoherent Pulse Combining for Improved Multiple Access LPI Network Performance", IEEE, 1993, 5 pgs.
Tsai et al., "Kasami Code-Shift-Keying Modulation for Ultra-Wideband Communication Systems", IEEE Transactions on Communications, vol. 55, No. 6, Jun. 2007, 11 pgs.
WCA, Ultra-Wideband (UWB) Technologies, Jan. 12, 2005, 68 pgs.
Brown et al., "Data Separation in High Density Environments", U.S. Appl. No. 12/387,485, Office Action, Mar. 21, 2012, 16 pgs.
Burkart et al., "Systems and Methods for RFID Tag Operation", U.S. Appl. No. 12/387,460, Office Action, Feb. 29, 2012, 11 pgs.
Burkart et al., "Systems and Methods for Relaying Information With RFID Tags", U.S. Appl. No. 12/387,489, Office Action, Mar. 5, 2012, 13 pgs.
Burkart et al., "Systems and Methods for Relaying Information With RFID Tags", U.S. Appl. No. 12/387,489, Response, Jun. 5, 2012, 25 pgs.
Anderson et al., "Systems and Methods for Communication With RFID Tags", U.S. Appl. No. 12/387,461, Office Action, Dec. 8, 2011, 11 pgs.
Anderson et al., "Systems and Methods for Communication With RFID Tags", U.S. Appl. No. 12/387,461, Amendment, May 8, 2012, 26 pgs.
Burkart et al., "Systems and Methods for RFID Tag Operation", U.S. Appl. No. 12/387,460, Amendment, Jun. 15, 21 pgs.
Burkart et al., "System and Methods for Relaying Information With RFID Tags", U.S. Appl. No. 12/387,489, Final Office Action, Jul. 25, 2012, 15 pgs.
Burkart et al., "Systems and Methods for RFID Tag Operation", U.S. Appl. No. 12/387,460, Final Office Action, Aug. 29, 2012, 13 pgs.

* cited by examiner

SYNCHRONIZATION OF DEVICES IN A RFID COMMUNICATIONS ENVIRONMENT

FIELD OF THE INVENTION

This invention relates generally to data communication, and more particularly to separation of data communication in high density environments.

BACKGROUND OF THE INVENTION

As defined by the FCC, an ultra-wideband (UWB) signal is an antenna transmission in the range of 3.1 GHz up to 10.6 GHz at a limited transmit power of −41.3 dBm/MHz with an emitted signal bandwidth that exceeds the lesser of 500 MHz or 20% of the center frequency. UWB signals are currently employed for high-bandwidth, short range communications that use high bandwidth radio energy that is pulsed at specific time instants.

Applications for FCC-defined UWB transmissions include distance-based location and tracking applications, and localization techniques that employ precision time-of-arrival measurements. Examples of such UWB applications include radio frequency identification (RFID) tags that employ UWB communication technology for tracking, localization and transmitting information. Other types of UWB applications include precision radar imaging technology. Inventory tracking has been implemented through the use of passive, active and semi-passive RFID devices. These devices have widespread use, and typically respond to interrogation or send data at fixed intervals.

A high density active radio frequency identification (aRFID) environment can easily exceed 1000 aRFID tags for certain application installations, such as cattle feedlot applications where individual cows are each tagged with an aRFID tag. Currently, aRFID installations such as these may be implemented using a maximum of approximately 1000 aRFID tags per each RFID receiver that is provided for the installation. However, aRFID environments may routinely contain in excess of 40,000 tags within a 1 to 2 sq mile area. One previous attempt that has been made to reliably receive and process tag data, and to perform geolocation calculations in such environments, is to use software-only coding schemes in order to help distinguish between multiple tags. This method typically works up to the point where available bandwidth is exceeded due to the number of bits being transmitted (~100 bits per tag transmission) and the number of tags in the environment (~1000). Existing RFID tag geolocation technologies employ RFID tags which typically report data at a fixed rate, which is acceptable for low tag density environments (i.e., tag density less than approximately 1000) where interleaved and colliding packets are not problematic.

Traditional time difference of arrival (TDOA) techniques that are employed to locate emitters, such as transmitting RFID tags, require that the absolute time of arrival (TOA) of an emitted signal at each of two or more receivers be recorded and the difference taken, or require that the two signals be processed using a cross correlation method. The primary source of error in determining the absolute TOA is the accuracy with which the arrival time of the emitted signal may be measured at each receiver. Although a high degree of timing accuracy can, in principal, be obtained by employing highly synchronized clocks at each receiver (e.g., using synchronized atomic clocks), this can be a very expensive option. Use of a cross correlation method is appropriate only for narrow band signals and also lacks a high degree of precision.

SUMMARY OF THE INVENTION

Disclosed herein are systems and methods for data separation, which may be employed to reliably receive and process RFID tag data, and/or to perform tag geolocation calculations in environments where the total number of RFID tags exceeds 1000, for example as may be encountered in RF signal environments where multiple RFID tags are tracked, localized and/or employed to transmit information. Examples of such RFID environments include, but are not limited to, high density aRFID environments having a total number of aRFID tags that exceed 1000, e.g., cattle feed lot applications where over 1000 individual cows are each tagged with an aRFID tag. However implemented, each RFID tag device may have a unique identifier that is associated with an object to which it is associated (e.g., attached or otherwise coupled) such that the location of the RFID tag is representative of the location of the object. In this manner, a user or other entity may readily identify the current location of a particular object, based on the location of its associated transmitting RFID tag. The disclosed systems and methods may be implemented in a variety of applications (e.g., asset or inventory tracking, sensor networks, geolocation devices, etc.) and may be implemented using passive, active and/or semi-passive RFID tag devices that respond to interrogation and/or send data at fixed intervals. In this regard, semi-passive RFID tag devices may remain in a sleep mode until receipt of a signal (e.g., interrogator polling signal) that wake up the device for transmission using internal battery powered transmitter onboard the semi-passive tag.

In one exemplary embodiment the disclosed systems and methods may be implemented for data separation in a high density aRFID environment that includes greater than about 10,000 tags (e.g., greater than about 40,000 tags within a 1 square mile area), and/or using a receiver to RFID tag ratio of less than about 1 receiver to 2500 tags (1/2500). In another exemplary embodiment, the disclosed systems and methods may be implemented to allow an RFID tracking environment to employ a total number of RFID tags that exceeds about 1000 tags, and/or in which the individual tag transmission rate exceeds about 100 bits per RFID tag transmission. In yet another exemplary embodiment, the disclosed systems and methods may be implemented to allow an RFID tracking environment to employ up to 100,000 RFID tags with an individual tag transmission rate up to about 100 bits per RFID tag transmission, it being understood that greater than 100,000 RFID tags may be employed in an RFID tracking environment and/or tag transmission rates of greater than 100 bits per RFID tag transmission may be possible in other embodiments.

The disclosed systems and methods may be implemented using a first band that is multiple channel-based, meaning that the RF spectrum of the first frequency band is broken up or divided into a plurality of separate channels, and first band communications may be achieved between any two devices of the disclosed systems and methods using a subset of the channels within the first band (e.g., a single one of the channels, two of the channels, etc.) and/or in narrow band fashion by using a sub-set of the channels within the band, e.g., using less than three of the channels. In this way, a first channel of the first band may be used for communication between a first pair of system devices and a second channel of the first band may be used for communication between a second pair of system devices. Such a multi-band RFID tag system may be further configured to have a second band (e.g., wide band such as UWB) transmitter, e.g., for responding to RFID interrogation signals from an interrogator. The disclosed systems and methods may also employ a second band frequency band that is non-channel based, meaning that the RF spectrum of the second frequency band is not broken up or divided up into separate channels, but rather the communication signals are spread across the second frequency band such that the undivided second band may be used by the RFID tag system for all second band communications between devices of the system. One example of a multiple channel-based first band is a narrow band frequency modulation (NBFM) frequency band having a plurality (e.g., 50) channels, and one example of a non channel-based second band is a pulse-based frequency band such as UWB.

Features that may be implemented in various possible embodiments of the disclosed systems and methods include, but are not limited to, a first band (e.g., Narrow Band Frequency Modulation "NBFM") channelized interrogator, spatial diversity separation technique, frequency diversity separation technique, and/or multi-band aRFID tags that receive data using a first band of signals (e.g., NBFM signals) and only transmit using a second band of signals (e.g., UWB signals) when interrogated. Further features that may be implemented include, but are not limited to, wireless synchronization of individual aRFID tag circuitry with a first band interrogator to minimize operating time of a first band receiver of the individual aRFID tag.

In one exemplary embodiment, an active RFID interrogator (aRFIDI) system may be provided that combines spatial and frequency separation techniques in order to reduce the aRFIDI system tag transmission density, e.g., by a factor of about 400 in any one second interval. Such an aRFIDI system may be positioned, for example, at or near the center of a master coverage area (e.g., livestock feed lot, cultivated field, race track, hospital, warehouse, prison, city block, sports stadium, amusement park, airport, train station, shipyard, shop, factory, library, armory, military base, police station, etc.) to be covered by aRFID communications between the aRFIDI system and multiple tags (e.g., which may be associated with individual livestock, farm equipment, race cars, trucks, rental cars and other vehicles, hospital patients, warehouse articles/boxes, library books, legal documents, tools, machines, guns or other weapons and accessories therefor, prisoners, sports players or fans, amusement park patrons, baggage and/or passengers, ships or cargo, etc.) that may roam throughout the given master coverage area.

The aRFIDI system may be provided with multiple antenna panels (or other type of directional antenna or directional signal transmission system configuration) that are spaced so that each panel covers a desired angle or area of coverage for selective signal communication (signal transmission and/or reception) within a sector of the overall master coverage area, e.g., eight 45 degree coverage antenna panels that are equally spaced so as to cover a full 360 degrees of an overall master coverage area in eight sectors, it being understood that other sector geometries or shapes (i.e., other than pie-shaped) are possible, and/or that other numbers of sectors provided within a master coverage area (i.e., greater or lesser than eight) are also possible. An aRFIDI system may be further configured to transmit on each of a selected number of multiple pre-defined channels of a first band (e.g., 50 predefined NBFM channels) in each one of the sector coverage areas defined by a given antenna panel. The transmit time by the aRFIDI system on each of the predefined first band channels in a given sector coverage area may be shared with the other predefined first band channels during a selected transmission time interval allocated for the given sector coverage area such that a signal transmission occurs on each of the multiple first band channels within the given sector coverage area once during the allocated time interval.

Within each sector coverage area of the overall master coverage area, roaming aRFID tags having assigned reception channels corresponding to one of the predefined first band channels may be interrogated using this methodology. In this regard, each of the multiple roaming aRFID tags may be configured to receive on one of the predefined first band channels, with each of the multiple predefined first band channels being assigned to at least one aRFID tag, and possibly more than one tag. Each of the multiple aRFID tags may have the capability to move from one sector coverage area to another sector coverage area by virtue of the host to which they are attached (e.g., livestock, vehicles, persons, baggage, ships, etc.) such that at any given time, the aRFID tags present within a given sector coverage area have a first band receive capability that is randomly distributed between the multiple predefined first band channels. When each aRFIDI system tag present within a given sector coverage area receives a first band interrogator signal from the aRFIDI system, a second band component (e.g., UWB component) of the tag is then tasked to transmit a response signal by a second and different band than the first band, i.e., each aRFIDI system tag will not transmit its second band response signal until interrogated over the first band channel by the aRFIDI system.

In one exemplary embodiment, an adaptive wakeup scheme or methodology may be implemented to allow an aRFID tag to stay synchronized with an aRFIDI system while at the same time optimizing power consumption. Depending on the particular configuration of a given aRFID tag, the battery life of an aRFID tag may be greatly reduced by first band signal receiving operations. Thus, in this exemplary embodiment, a first band receiver (or transceiver) component of an aRFID tag may only be operated when a first band packet is expected from an aRFIDI system, and in a manner that reduces the amount of time between when the first band receiver is turned on and when the first band packet is received (i.e., the receive buffer time). At other times, the aRFID tag may be placed in a low power consumption sleep state. The amount of time that an aRFID tag spends in such a low power sleep state before waking and receiving the following interrogate packet (i.e. when an aRFIDI system is sending out polling packets at a known rate) may also be optionally adjusted, e.g., to fit characteristics of a given situation and/or to re-synchronize a given aRFID tag with first band transmissions from an aRFIDI. Thus, the disclosed systems and methods may be implemented in a manner that allows a given aRFID tag to receive packets from an aRFIDI system within a given receive buffer time, while also correcting for clock drift between the aRFIDI system and the given aRFID tag.

In one respect, disclosed herein is a method of operating a radio frequency identification (RFID) tag within a radio frequency identification (RFID) communication environment, including: providing at least one RFID tag configured to receive periodic first band RF signal interrogator polling signals to transmit second band RF signal response signals in response thereto, the first band being a multiple channel-based frequency band and the second band being a non-channel based frequency band. The method includes repeatedly and alternately performing the following two steps: operating the RFID tag in a timed low power sleep mode for a predefined sleep time during which the RFID tag does not listen for transmitted first band RF signal interrogator polling signals, and then waking the RFID tag to operate in a timed powered up listening mode for a predefined tag listening time during which the RFID tag actively listens for transmitted first band RF signal interrogator polling signals; and the method may further include dynamically adjusting the length of the predefined sleep time before again waking the RFID tag to the listening mode.

In another respect, disclosed herein is a frequency identification (RFID) tag system, including: first band receiver or transceiver circuitry configured to receive periodic first band RF signal interrogator polling signals and second band transmitter circuitry configured to transmit second band RF signal response signals in response thereto, the first band being a multiple channel-based frequency band and the second band being a non-channel based frequency band. The system may further include at least one processing device to repeatedly and alternately perform the following two steps: operate the circuitry of the RFID tag in a timed low power sleep mode for a predefined sleep time during which the first band receiver or transceiver circuitry does not listen for transmitted first band RF signal interrogator polling signals, and then wake up circuitry of the RFID tag to operate in a timed powered up listening mode for a predefined tag listening time during which the first band receiver or transceiver circuitry actively listens for transmitted first band RF signal interrogator polling signals. The processing device may also be configured to dynamically adjust the length of the predefined sleep time before again waking circuitry of the RFID tag to the listening mode.

In another respect, disclosed herein is a method of operating a radio frequency identification (RFID) tag within a radio frequency identification (RFID) communication environment, including: alternately operating at least one RFID tag between a non-synchronized state with a periodic interrogator polling signal and a synchronized state with a periodic interrogator polling signal, the RFID tag being configured to receive periodic first band RF signal interrogator polling signals and to transmit second band RF signal response signals in response thereto, the first band being a multiple channel-based frequency band and the second band being a non-channel based frequency band. The non-synchronized state of the method may include: operating the RFID tag in a timed non-synchronized low power sleep mode for a predefined non-synchronized sleep time during which the RFID tag does not listen for transmitted first band RF signal interrogator polling signals, then waking up the RFID tag to perform one or more tag processing operations, then returning the RFID tag to the timed non-synchronized low power sleep mode for the predefined non-synchronized sleep time if the number of immediately previous consecutive sleep times is less than a predefined threshold, or operating the RFID tag in a timed powered up non-synchronized listening mode for a predefined non-synchronized tag listening time during which the RFID tag actively listens for transmitted first band RF signal interrogator polling signals if the number of immediately previous consecutive sleep times is greater than or equal to a predefined threshold. The synchronized state of the method may include: operating the RFID tag in a timed synchronized low power sleep mode for a predefined synchronized sleep time during which the RFID tag does not listen for transmitted first band RF signal interrogator polling signals, then waking up the RFID tag to operate in a timed powered up synchronized listening mode for a predefined synchronized tag listening time during which the RFID tag actively listens for transmitted first band RF signal interrogator polling signals, performing the following steps if an interrogator polling signal is received during a given synchronized listening mode: processing the latest received interrogator polling signal, performing one or more tag processing operations, increasing or decreasing the length of the predefined synchronized sleep time based on the given receipt time of the interrogator polling signal as necessary to maintain a predefined alignment time between the start time of the synchronized listening mode and the given receipt time of the periodic interrogator polling signal, and then returning the RFID tag to the timed synchronized low power sleep mode for the predefined synchronized sleep time, and performing the following steps if an interrogator polling signal is not received during a given synchronized listening mode: decreasing the length of the predefined synchronized sleep time by an incremental amount of time, performing one or more tag processing operations, and then returning the RFID tag to the timed synchronized low power sleep mode for the predefined synchronized sleep time if the number of consecutive times that an interrogator polling signal has not been received is less than a predefined threshold, or then operating the RFID tag in the non-synchronized state if the number of consecutive times that an interrogator polling signal has not been received is greater than a predefined threshold.

In another respect, disclosed herein is a frequency identification (RFID) tag system, including: first band receiver or transceiver circuitry configured to receive periodic first band RF signal interrogator polling signals and second band transmitter circuitry configured to transmit second band RF signal response signals in response thereto, the first band being a multiple channel-based frequency band and the second band being a non-channel based frequency band; and at least one processing device to repeatedly and alternately operate the RFID tag between a non-synchronized state with a periodic interrogator polling signal and a synchronized state with a periodic interrogator polling signal. In the non-synchronized state the at least one processing device may be configured to: operate the first band receiver or transceiver circuitry of the RFID tag in a timed non-synchronized low power sleep mode for a predefined non-synchronized sleep time during which the first band receiver or transceiver circuitry does not listen for transmitted first band RF signal interrogator polling signals, then wake up the first band receiver or transceiver circuitry to perform one or more tag processing operations, then return the first band receiver or transceiver circuitry to the timed non-synchronized low power sleep mode for the predefined non-synchronized sleep time if the number of immediately previous consecutive sleep times is less than a predefined threshold, or operate the first band receiver or transceiver circuitry in a timed powered up non-synchronized listening mode for a predefined non-synchronized tag listening time during which the first band receiver or transceiver circuitry actively listens for transmitted first band RF signal interrogator polling signals if the number of immediately previous consecutive sleep times is greater than or equal to a predefined threshold. In the synchronized state the at least one processing device may be configured to: operate the first band receiver or transceiver circuitry in a timed synchronized low power sleep mode for a predefined synchronized sleep time during which the first band receiver or transceiver circuitry does not listen for transmitted first band RF signal interrogator polling signals, then wake the first band receiver or transceiver circuitry to operate in a timed powered up synchronized listening mode for a predefined synchronized tag listening time during which the first band receiver or transceiver circuitry actively listens for transmitted first band RF signal interrogator polling signals, perform the following steps if an interrogator polling signal is received during a given synchronized listening mode: process the latest received interrogator polling signal, perform one or more tag processing operations and increase or decrease the length of the predefined synchronized sleep time based on the given receipt time of the interrogator polling signal as necessary to maintain a predefined alignment time between the start time of the synchronized listening mode and the given receipt time of the periodic interrogator polling signal, and then return the RFID tag to the timed synchronized low power sleep mode for the predefined synchronized sleep time, and perform the following steps if an interrogator polling signal is not received during a given synchronized listening mode: decrease the length of the predefined synchronized sleep time by an incremental amount of time and perform one or more tag processing operations, and then return circuitry of the RFID tag to the timed synchronized low power sleep mode for the predefined synchronized sleep time if the number of consecutive times that an interrogator polling signal has not been received is less than a predefined threshold, or then operate the RFID tag in the non-synchronized state if the number of consecutive times that an interrogator polling signal has not been received is greater than a predefined threshold.

DESCRIPTION OF ILLUSTRATIVE EMBODIMENTS

Figure 1:
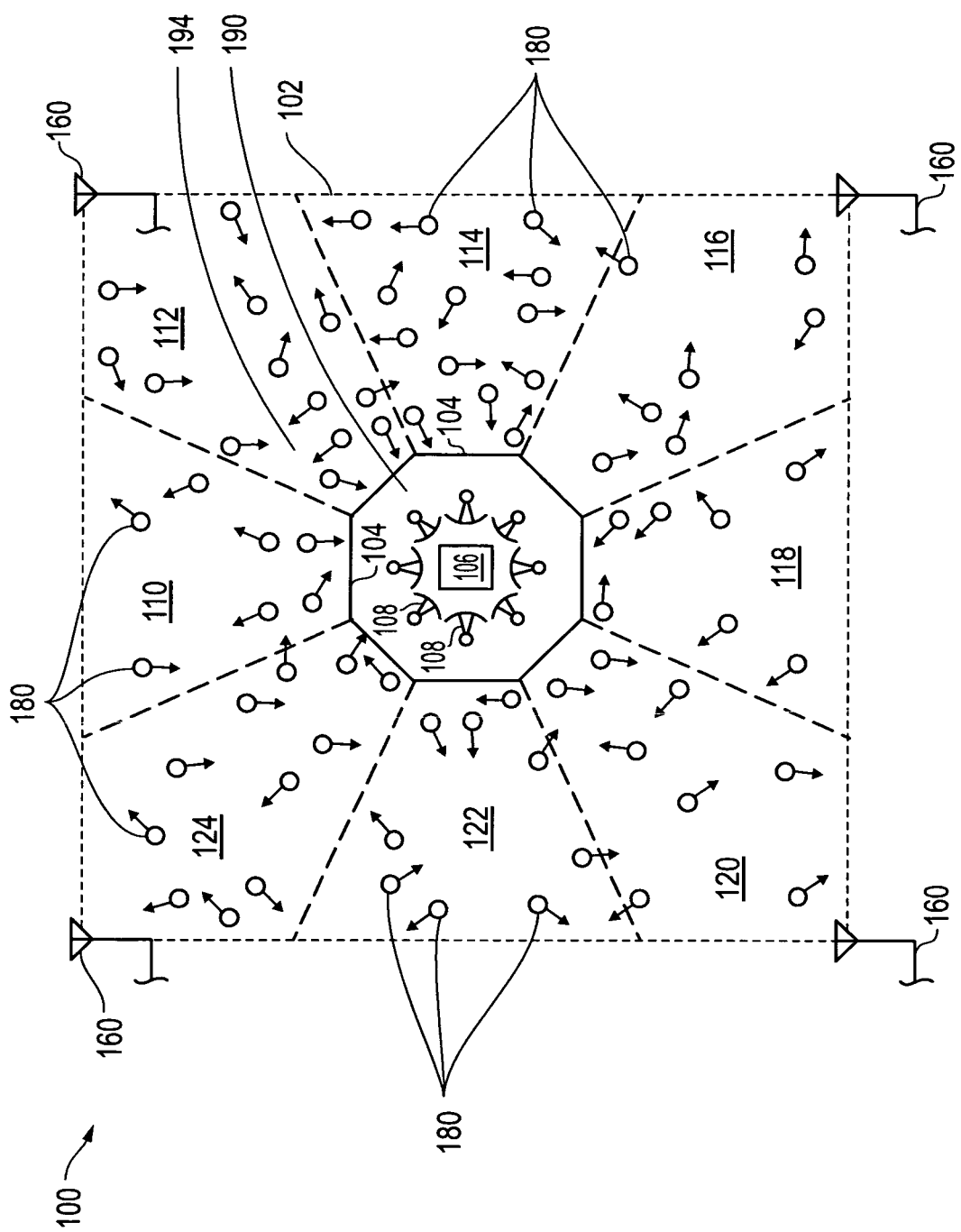
FIG. 1 shows an aRFID communication system according to one exemplary embodiment of the disclosed systems and methods.

FIG. 1 illustrates one exemplary embodiment of an aRFID communication system 100 that includes a master coverage area 194 defined between outer boundary 102 and inner boundary 104 of the system 100. In one embodiment such a master coverage area may be, for example 1 mile by 1 mile square, although other sized master coverage areas (both smaller and larger), and/or other shapes of master coverage areas may be implemented in other embodiments. Although an aRFID system and associated devices are described herein, it will be understood that embodiments of the disclosed systems and methods may also be implemented with passive RFID tags and semi-passive RFID tags, as well as RFID communication systems employing the same.

As shown in FIG. 1, a remote active RFID interrogator (aRFIDI) system 190 with its corresponding directional signal transmission system (e.g., multiple outwardly facing antenna panels) is positioned within the boundaries of (e.g., in this case substantially at the center of) the master coverage area 194 (e.g., on an elevated tower). In this embodiment, the directional signal transmission system includes an antenna array of eight outwardly-facing 45° beamwidth transmission antenna panels 108 that are equally spaced such that they together cover a full 360 degrees of transmission angle as shown, i.e., allowing the selective scanning of eight 45° sector coverage areas 110, 112, 114, 116, 118, 120, 122 and 124 one sector coverage area at a time. However, it will be understood that in other embodiments a directional signal transmission system need not be positioned near the center of a master coverage area, or even within the boundaries of a master coverage area, e.g., a directional signal transmission system may be positioned on or near a boundary of a master coverage area, and/or cover less than a full 360 degrees of transmission angle. Further, more than one aRFIDI system 190 may be positioned within a common master coverage area, and/or additional aRFIDI systems 190 may be added over time, e.g., as the number of aRFID tags 180 within a master coverage area grows.

Still referring to FIG. 1, the aRFIDI system 190 also includes NBFM interrogator transmitter circuitry 106 that is coupled to each of the eight 45 degree antenna panels 108. In one exemplary embodiment, the aRFIDI system 190 may be configured for transmission using NBFM signal transmissions in an unlicensed 900 MHz frequency band (ranging from 902-907 MHz) or an unlicensed 915 MHz ISM band (ranging from 902-928 MHz) or unlicensed 433 MHz frequency band or any other unlicensed band, it being understood that other unlicensed or licensed frequency bands and non-NBFM frequencies may alternatively be employed for interrogator first band transmissions depending on the area of use and/or needs of the given application. In one exemplary embodiment, aRFIDI interrogator system 190 may include NBFM interrogator transmitter circuitry 106 that is coupled to and controlled by at least one processing device, e.g., microprocessor, central processing unit (CPU), field gate programmable array (FPGA), application specific integrated circuit (ASIC), etc.

In one exemplary embodiment, outer boundary 102 and inner boundary 104 of aRFID communication system 100 may be, for example, fence lines of a cattle feedlot, although outer boundary 102 and inner boundary 104 of aRFID communication system 100 may alternatively represent other types of master coverage areas 194, e.g., such as walls of a prison yard, inner and outer boundary walls of a race track, walls of a warehouse building, etc. Size of master coverage area 194 may vary, depending on the needs of a given application, but in one embodiment size of a square-shaped master coverage area 194 may be from about 1 to about 4 miles across (e.g., from about 640 acres to about 10,240 acres in areal coverage). It will also be understood that the particular outer boundary 102 and inner boundary 104 of aRFID communication system 100 are exemplary only, and other shapes and sizes of master coverage areas 194 may be implemented in the practice of the disclosed systems and methods. Moreover, boundaries 102 and 104 need not be present as physical boundaries, e.g., interrogator system 190 may be positioned on an elevated tower in the center of feedlot with no physical boundary around the tower. In addition it is not necessary that an aRFIDI system be positioned in the center of a master coverage area as is the case in the exemplary embodiment of FIG. 1.

Still referring to FIG. 1, individual roaming aRFID tags 180 are shown dynamically changing position within master coverage area 194. Depending on the given application, each of aRFID tags 180 may be attached or otherwise associated with a carrier, such as an animal, person or vehicle. In the exemplary embodiment of FIG. 1, roaming aRFID tags 180 are randomly moving within master coverage area 194, such as would be the case with cattle moving within a feed lot, or boxes in a warehouse. In other embodiments, such as would be the case with a race track, individual tags may be moving in a common direction around the course of the track.

In one exemplary embodiment, each of aRFID tags 180 may be configured with the capability to receive NBFM transmissions in one of at least 50 NBFM channels that are randomly distributed among the aRFID tags 180 with a channel spacing of about 100 KHz. For example, when each aRFID tag is programmed, one of fifty 900 MHz channels may be selected as that tag's default frequency, so that the manufactured tags are evenly distributed among the 50 available channels. In this regard, 50 channels is the current minimum number of channels required to meet FCC restrictions for a frequency hopping system within the 900 MHZ ISM band (902-928 MHz). Operation under the FCC frequency hopping definition enables a maximum amount of power to be transmitted (+36 dBm), which increases the overall range of the aRFIDI system 100 in one exemplary embodiment to approximately 4 miles. However, it will be understood that any other number of multiple interrogation channels (e.g., greater or lesser than 50 channels) may be employed in the practice of the disclosed systems and methods.

During operation, aRFIDI system 190 selectively scans the eight 45° sector coverage areas 110, 112, 114, 116, 118, 120, 122 and 124 one at a time and in succession in order to spatially separate the master coverage area into eight parts, i.e., so that aRFIDI system 190 only transmits interrogator polling signals to one sector coverage area at a time. To scan each sector coverage area, the aRFIDI system 190 transmits a data packet (e.g., at 19.2K baud data rate) on a first one of the 50 NBFM channels for a given transmit time (e.g., of about 2.5 ms) followed by an additional pause time that may optionally be greater than the given transmit time (e.g., to yield a total dwell time for each channel that is about 20 ms) before changing over to the next one of the 50 NBFM channels in a frequency hopping manner. In this way, the aRFIDI system 190 may be configured to frequency separate the tags present within a master coverage area by transmitting once on each of the 50 channels (e.g., for a total dwell of 1 second) in each of the 8 sector coverage areas (e.g., yielding a revisit time of 8 seconds). As will be described further herein, each of the given RFID tags 180 that are present in the current sector coverage area (and which are configured to receive on the current specifically broadcast NBFM channel) will respond on a second and different band from the NBFM band with a transmission (e.g., UWB transmission) of their own upon receiving the current NBFM interrogation signal on their specific assigned channel.

Second band receiver antennas 160 of FIG. 1 are positioned as shown at known locations at the corners of outer boundary 102 to receive the tag second band transmissions for further processing, e.g., tracking, localization and/or transmittal of information. In this embodiment, each of tags 180 is configured not to transmit a UWB signal (e.g., when it is set to interrogate or standby mode) unless a specially formatted interrogate data packet is received by the given tag at 19.2 k baud, on its factory pre-programmed NBFM channel. When employed as a second band signal in this exemplary embodiment, a UWB signal is an antenna transmission in the range of 3.1 GHz up to 10.6 GHz at a limited transmit power of −41.3 dBm/MHz with an emitted signal bandwidth that exceeds the lesser of 500 MHz or 20% of the center frequency. In this embodiment UWB signals are employed for second band signal communication. However, it will be understood that other non-UWB communication signals (e.g., signals of other non-multiple channel-based frequency band) may be employed for second band communication in the practice of the disclosed systems and methods depending on the area of use and/or needs of the given application (e.g., 433 MHz or 915 MHz frequency bands or other suitable band). Moreover, it is also possible that more than two bands may be employed for communication by an aRFID communication system 100.

For a square-shaped master coverage area 194 having side dimensions of about 1 mile in length, receivers 160 are spaced about 0.7 miles from the transmission antenna panels 108 of the centrally located aRFIDI system 190, and for a square-shaped master coverage area 194 having side dimensions of about 4 miles in length, receivers 160 are spaced about 2.8 miles from the transmission antenna panels 108 of the centrally located aRFIDI system 190. However, it will be understood that antenna/receiver spacing may vary according to the specific master coverage area dimensions of a given aRFID communication system 100, and/or with the transmission and reception capabilities of a given aRFID communication system 100. Further, it will be understood that in those cases where the first band signal communication range of an aRFIDI system 190 will not reach the entire area of its corresponding master coverage area 194, those aRFID tags 180 that are located outside the first band signal communication range of any aRFIDI system 190 may be configured to intermittently transmit second band response signals, e.g., in a manner as described and illustrated in relation to step 556 of the non-synchronized state 570 of FIG. 5 described further herein.

Thus, in the illustrated exemplary embodiment of FIG. 1, aRFIDI system 190 combines spatial (time-separated spaces) and frequency separation (frequency hopping) techniques in order to reduce the tag density by a factor of 400 (i.e., 8 sectors×50 channels per sector) in any one second interval. However, it will be understood that in other embodiments, that either of such spatial or frequency separation techniques may be practiced alone without the other. Furthermore, it will also be understood that code division multiple access ("CDMA") and/or frequency division multiple access ("FDMA") may be implemented as channel access methods in combination with the spatial (time-separated spaces) and frequency separation (frequency hopping) techniques employed herein.

One exemplary embodiment of 50 possible 900 MHz frequencies that may be employed by aRFIDI system 190 for channels 1-50 is shown in the following Table 1.

TABLE 1

Exemplary Interrogator and Tag 900 MHz Frequency Channels

| Channel # | Freq. |
|---|---|
| 1 | 902.0 |
| 2 | 902.1 |
| 3 | 902.2 |
| 4 | 902.3 |
| 5 | 902.4 |
| 6 | 902.5 |
| 7 | 902.6 |
| 8 | 902.7 |
| 9 | 902.8 |
| 10 | 902.9 |
| 11 | 903.0 |
| 12 | 903.1 |
| 13 | 903.2 |
| 14 | 903.3 |

TABLE 1-continued

Exemplary Interrogator and Tag 900 MHz Frequency Channels

| Channel # | Freq. |
|---|---|
| 15 | 903.4 |
| 16 | 903.5 |
| 17 | 903.6 |
| 18 | 903.7 |
| 19 | 903.8 |
| 20 | 903.9 |
| 21 | 904.0 |
| 22 | 904.1 |
| 23 | 904.2 |
| 24 | 904.3 |
| 25 | 904.4 |
| 26 | 904.5 |
| 27 | 904.6 |
| 28 | 904.7 |
| 29 | 904.8 |
| 30 | 904.9 |
| 31 | 905.0 |
| 32 | 905.1 |
| 33 | 905.2 |
| 34 | 905.3 |
| 35 | 905.4 |
| 36 | 905.5 |
| 37 | 905.6 |
| 38 | 905.7 |
| 39 | 905.8 |
| 40 | 905.9 |
| 41 | 906.0 |
| 42 | 906.1 |
| 43 | 906.2 |
| 44 | 906.3 |
| 45 | 906.4 |
| 46 | 906.5 |
| 47 | 906.6 |
| 48 | 906.7 |
| 49 | 906.8 |
| 50 | 906.9 |

Figure 2:
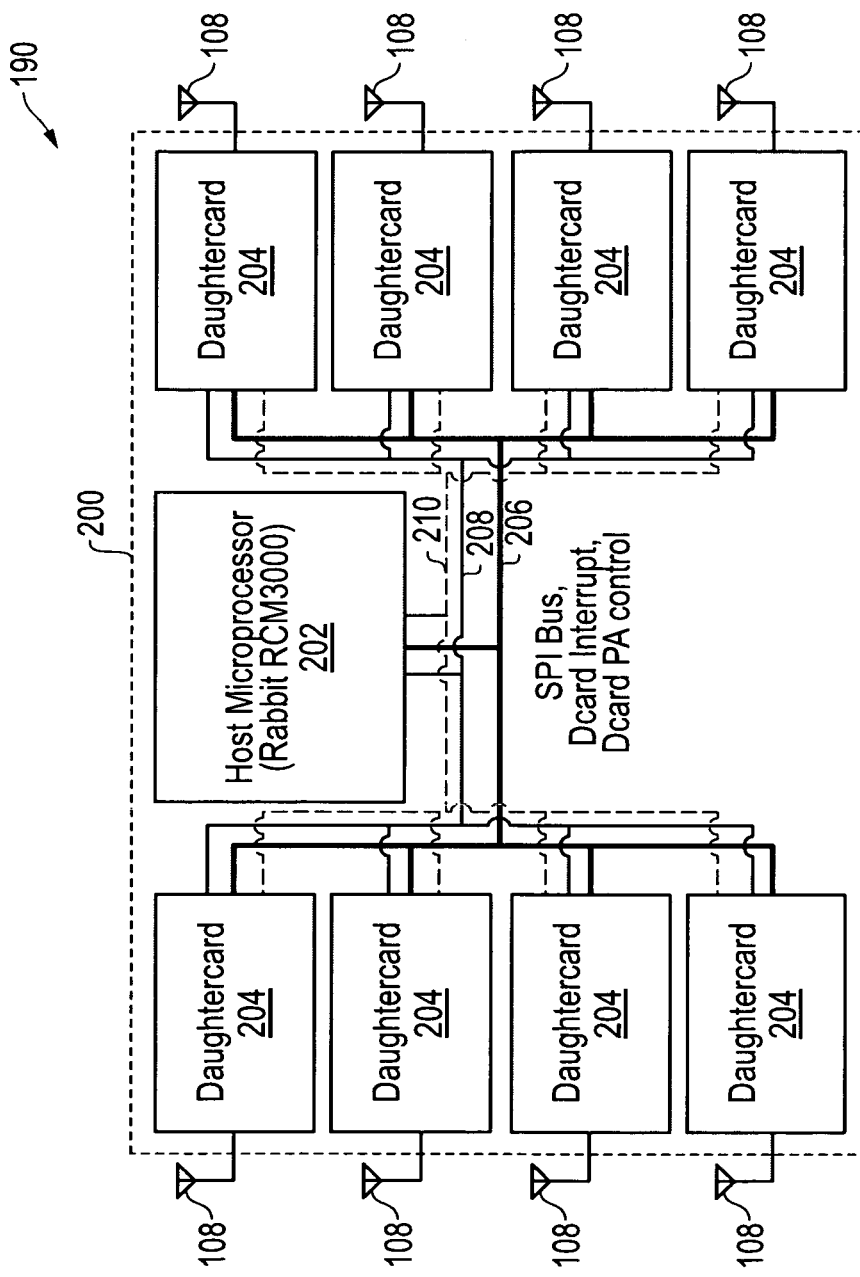
FIG. 2 is a block diagram of an aRFIDI system according to one exemplary embodiment of the disclosed systems and methods.

FIG. 2 is a simplified block diagram of an aRFIDI system 190 of FIG. 1 as it may be configured according to one exemplary embodiment of the disclosed systems and methods. As shown in FIG. 2, aRFIDI system 190 may include a interrogator host card 200 (e.g., printed circuit board) that is provided with eight interrogator daughtercards 204 coupled to a host microprocessor 202 by a serial peripheral interface (SPI) bus or other suitable signal communication bus. Host microprocessor 202 may be, for example, a RCM3000 RabbitCore® 10 Base-T Ethernet microprocessor core module with program memory that is available from Rabbit Semiconductor Inc. of Davis, Calif., or other suitable processing device (e.g., microprocessor, processor, field programmable gate array, application specific integrated circuit, etc.). In this embodiment, host microprocessor 202 is also coupled to each daughtercard 204 by a daughtercard interrupt line 208 and a daughtercard power amplifier control line 210. Each of daughtercards 204 is in turn coupled to a respective antenna (panel) 108, e.g., 45° beamwidth transmission antenna panels that are equally spaced such that they together cover a full 360 degrees of transmission angle as previously described in relation to FIG. 1. As further shown, host microprocessor 202 may include an Ethernet connection 295 to provide a network connection to aRFIDI system 190, e.g., for receiving commands at the host processor 202 from a remote application over a network.

Figure 3:
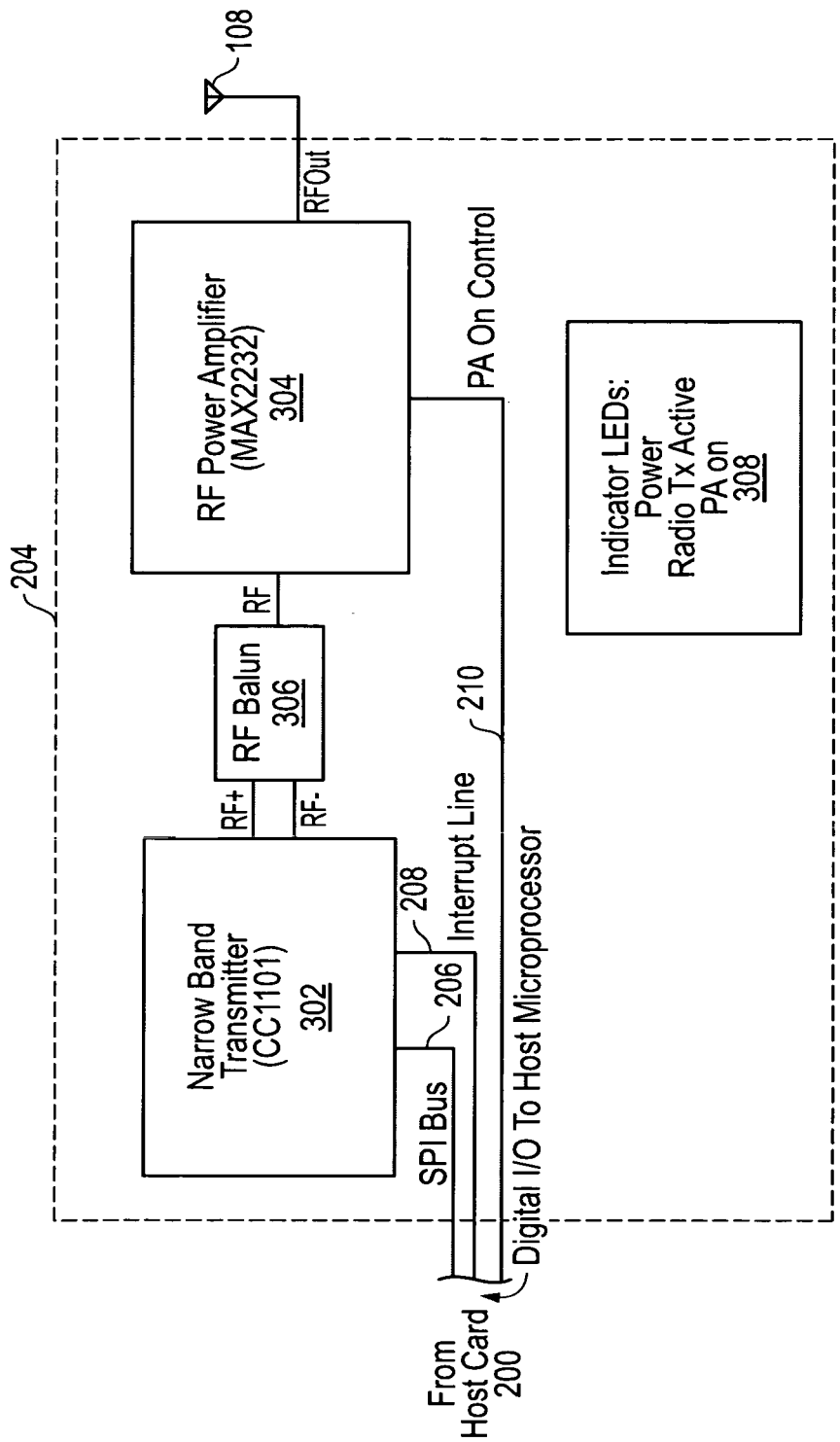
FIG. 3 is a block diagram of an interrogator daughtercard according to one exemplary embodiment of the disclosed systems and methods.

FIG. 3 is a simplified block diagram of an interrogator daughtercard 204 of FIG. 2 which may be, for example, a printed circuit board. As shown, each daughtercard 204 includes narrow band transmitter circuitry 302 coupled to RF power amplifier circuitry 304 through RF balun 306. Narrowband transmitter circuitry 302 may be, for example, a CC1101 sub-1 GHz RF transceiver available from Texas Instruments of Dallas, Tex., or another suitable narrowband RF transceiver or transmitter. RF power amplifier circuitry 304 may be, for example, a MAX2232 low voltage 900 MHz ISM silicon power amplifier available from Maxim Integrated Products, Inc. of Sunnyvale Calif., or other power amplifier suitable for 900 MHz ISM transmissions. Further shown in FIG. 3 are optional indicator light emitting diodes 308 that may be present to indicate interrogator daughterboard operating parameter states such as main power on/off state, RF transmission on/off state, power amplifier on/off state, etc. It will be understood that an aRFIDI system 190 may be optionally provided with receive capability in one exemplary embodiment, e.g., by providing each daughterboard 204 with a narrowband transceiver or a combination of narrowband transmitter and receiver components. Such a receive capability may be provided, for example, to allow aRFIDI system 190 to receive data such as relayed sensor data or other stored information that is transmitted by a RFID tag 180 via first band RF signal communications.

During operation, host microprocessor 202 of host card 200 controls components of a first daughterboard 204 corresponding to a first sector coverage area to transmit interrogator polling signals (e.g., specially formatted data packets at 19.2K baud data rate) on each of the multiple (e.g., 50) NBFM channels within the first sector coverage area, followed by controlling components of a second daughterboard 204 corresponding to a second sector coverage area to transmit interrogator polling signals on each of the multiple NBFM channels within the second sector coverage area, and so on in sequential fashion until each of the eight daughterboards 204 has so transmitted on each of the multiple NBFM channels within its corresponding sector coverage area, at which time the process is repeated starting again with the first daughterboard 204.

To control components of each respective daughterboard 204 to transmit interrogator signals at the desired time, host microprocessor 202 communicates outgoing data packets to the narrowband transmitter 302 of the respective daughterboard 204 by way of SPI bus 206. The narrowband transmitter 302 signals the completion of packet transmission to the host microprocessor 202 via an interrupt line 208. Host microprocessor 202 toggles the RF Power Amplifier on and off by way of PA control line 210. During operation, the indicator LED's 308 may be activated to indicate when the respective daughterboard 203 is powered up, when the respective daughterboard 204 is transmitting RF signals, and when the power amplifier 304 of the respective daughterboard 204 is powered up.

Other optional functions that may be performed by host microprocessor 202 of host card 200 include tag management tasks which may be implemented to enable aRFIDI system 190 to keep track of individual aRFID tags 180 or groups of aRFID tags 180 (i.e., if aRFIDI system 190 is configured with optional receive capability), and/or to change configuration parameters of one or more aRFID tags 180. For example, host microprocessor 202 may control aRFIDI system 190 to send commands by NBFM signals to one or more aRFID tags 180 that are operable to change one or more operations of the aRFID tag 180 (e.g., such as data report rate, transmit power levels, tag sleep intervals, etc.), e.g., based on a request received at network connection 295 from a remote application over a connected network). In this regard, it is possible that a NBFM command signal may be broadcast to only change operation of an individual aRFID tag 180, or that a NBFM command signal may be broadcast instructing all aRFID tags 180 within range of aRFIDI system 190 to change their operation.

Figure 4:
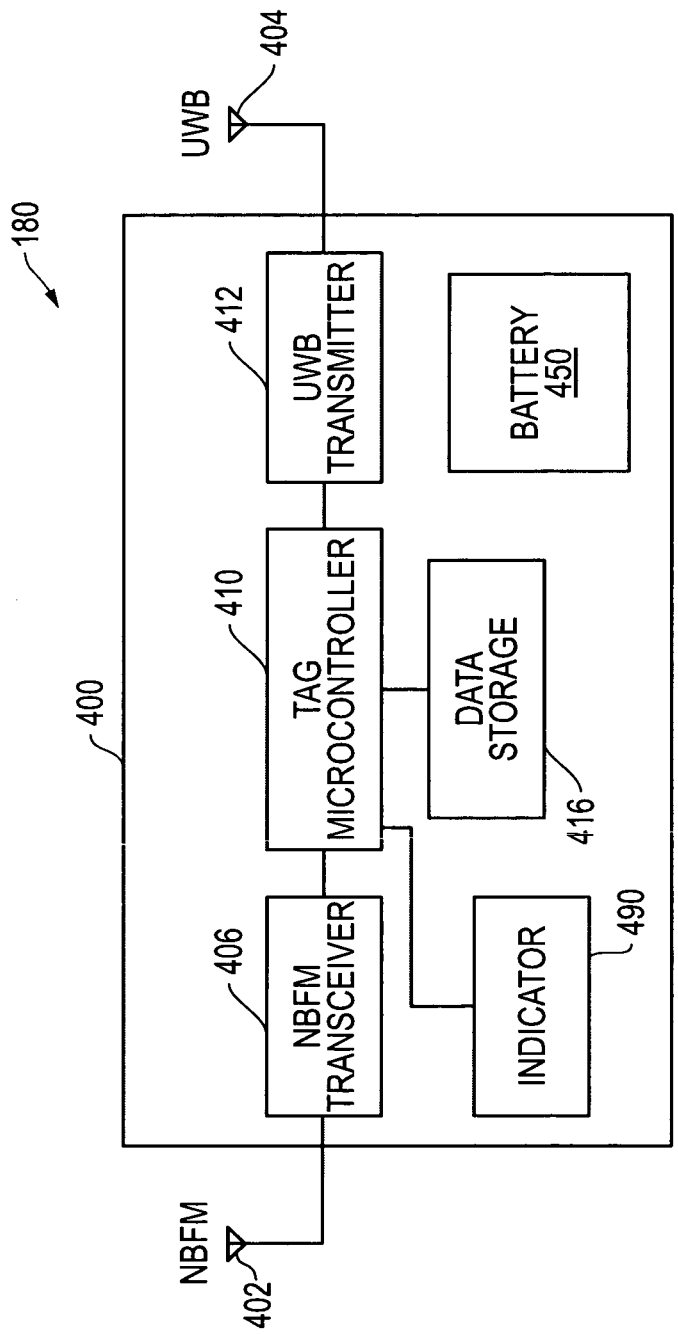
FIG. 4 is a block diagram of circuitry for a multi-band aRFID tag according to one exemplary embodiment of the disclosed systems and methods.

FIG. 4 illustrates one exemplary embodiment of circuitry 400 for multi-band aRFID tag 180 such as may be employed in the aRFID communication system 100 of FIG. 1. As shown in FIG. 4, aRFID tag 180 includes an NBFM antenna element 402 for receiving NBFM interrogator polling signals from aRFIDI system 190 of FIG. 1, and may optionally receive NBFM data transmissions from one or more local or embedded sensors (e.g., that report data about the object to which aRFID tag 180 is associated with or the local environment) or other equipment. NBFM antenna element 402 is coupled as shown to NBFM transceiver circuitry 406 that receives and transmits analog NBFM signals from NBFM antenna element 402 and exchanges digital NBFM signals with tag microcontroller 410. NBFM transceiver circuitry 406 may also operate to optionally transmit command signals to one or more sensors, change data rates or information content, etc. A tag battery or battery pack 450 may also be provided for aRFID tag 180 as shown, to provide power for operation of other components of aRFID tag 180 including tag microcontroller 410, NBFM transceiver circuitry 406, and UWB transmitter circuitry 412. In one exemplary embodiment, components of aRFID tag 180 may be hermetically sealed and isolated from the outside environment with no externally accessible electrical interconnections, i.e., such that the tag is only capable of wireless communication.

Still referring to FIG. 4, tag microcontroller 410 processes received NBFM interrogator polling signals (e.g., to determine if the received signal is of the correct data packet format corresponding to an interrogator polling signal transmitted by aRFIDI system 190), and in response thereto controls operation of UWB transmitter circuitry 412 to produce and transmit a UWB response signal via coupled UWB antenna element 404 that is formatted to include tag identification information that is unique to the given aRFID tag 180. A UWB response signal may also include status information about the tag, data points from optional sensor circuitry that may be associated with or in communication with the tag, etc. Tag microcontroller 410 may also optionally preprocess received sensor data prior to relaying this data to receiver circuitry coupled to each of UWB receiver antennas 160, and/or may also optionally provide power control signals to each of NBFM transceiver circuitry 406 and UWB transmitter circuitry 412 (e.g., in order to conserve power consumed by these components of aRFID tag 180 in-between tag transmissions). It will be understood that an interrogator polling signal may also include other instructions to control operations of aRFID tag 180, e.g., to cause aRFID tag 180 to record data from one or more external sensors, to cause aRFID tag 180 to transmit or otherwise exchange NBFM RF signals with other devices, to cause aRFID tag 180 to alter its timed sleep and listening cycles, etc.

As further shown in FIG. 4, tag microprocessor circuitry 410 may be coupled to on board data storage circuitry 416 (e.g., non-volatile memory), which may be provided for storage of records about the object/inventory being tracked or monitored, e.g., tag location data points giving history of where the object/inventory has been, UWB and NBFM data packet format information, data from optional circuitry (e.g., such as sensor circuitry that monitors one or more parameters of the environment in which the aRFID tag 180 exists at a given time), object/inventory ownership or identification information, medical or vaccination records (e.g., where the object is a cow or other livestock), etc. Further examples of possible functions and circuitry that maybe incorporated within a RFID tag 180, as well as collection and reporting of sensor data using such a RFID tag, may be found in concurrently filed U.S. patent application Ser. No. 12/387,460, entitled "SYSTEMS AND METHODS FOR RFID TAG OPERATION" by Scott M. Burkart, et. al., which is filed on the same date as the present application and which is incorporated herein by reference in its entirety. Examples of suitable UWB transmitter circuitry and UWB methodology that may be employed for UWB transmissions between aRFID tag 180 and aRFIDI system 190 include, for example, transmitter circuitry described in concurrently filed U.S. patent application Ser. No. 12/387,490, entitled "SYSTEMS AND METHODS FOR GENERATING PULSED OUTPUT SIGNALS USING A GATED RF OSCILLATOR CIRCUIT" by Ross A. McClain Jr., et al., and signal transmission systems and methods described in concurrently filed U.S. patent application Ser. No. 12/387,425, entitled "PULSE LEVEL INTERLEAVING FOR UWB SYSTEMS," by Bryan L. Westcott, et al., each of which is filed on the same date as the present application and each of which is incorporated herein by reference in its entirety.

Still referring to FIG. 4, tag microcontroller 410 may be configured in one exemplary embodiment to maintain synchronization with NBFM interrogator polling signals from aRFIDI system 190 within a sector coverage area. For example, components of an aRFID tag 180 may be configured to perform the tag active operations (e.g., data processing, UWB response signal transmission, gathering data from sensors, etc.) after receiving a polling signal from aRFIDI system 190, and then to enter a timed low power sleep mode to reduce power consumption in-between interrogator polling signals from system 190. Tag microcontroller 410 may be programmed with a sleep timer that wakes up the components of aRFID tag 180 before the next polling packet of an NBFM interrogator polling signal arrives from aRFIDI system 190. Due to relatively high power consumption rate of NBFM transceiver 406, the closer in time that the components of aRFID tag 180 (including NBFM transceiver 406) awake before receipt of the next polling packet, the more power that may be conserved to increase tag battery life. Such a configuration allows aRFID tag 180 to operate with a very small receive buffer time while staying synchronized with aRFIDI system 190.

Further shown in FIG. 4 is an optional tag external indicator 490 which may be provided onboard an aRFID tag 180. Tag external indicator 490 may be, for example, a visual indicator (e.g., light emitting diode, small strobe light, etc.), motion based indicator (e.g., vibrator), and/or an audio indicator (e.g., small speaker or beeper, etc.) that is powered by battery 450 and controlled by tag microcontroller 210. When present, such an optional tag external indicator 490 may be remotely activated by microcontroller 410 in response to an indicator request, for example, sent by first band NBFM signal transmissions to aRFID tag 180 from a tag interface device. When activated, external indicator 490 may be employed to produce an external indication (e.g., noise, light, motion such as vibrations, etc.) externally alert those persons in visual and/or audible range of indicator 490 of the current location of aRFID tag 180 and/or of a particular status of aRFID tag 180 or of an object with which it is associated.

Examples of suitable UWB transmitter circuitry and UWB methodology that may be employed for UWB transmissions between aRFID tag 180 and aRFIDI system 190 include, for example, transmitter circuitry described in concurrently filed U.S. patent application Ser. No. 12/387,490, entitled "SYSTEMS AND METHODS FOR GENERATING PULSED OUTPUT SIGNALS USING A GATED RF OSCILLATOR CIRCUIT" by Ross A. McClain Jr., et al., and signal transmission systems and methods described in concurrently filed U.S. patent application Ser. No. 12/387,425, entitled "PULSE LEVEL INTERLEAVING FOR UWB SYSTEMS," by Bryan L. Westcott, et al., each of which is filed on the same date as the present application and each of which is incorporated herein by reference in its entirety. Further information on methodology that may be employed for communication using RFID tags 180 may be found in concurrently filed U.S. patent application Ser. No. 12/434,192, entitled "MOBILE COMMUNICATION DEVICE AND COMMUNICATION METHOD," by Bryan L. Westcott et al., which is filed on the same date as the present application and which is incorporated herein by reference in its entirety.

Figure 5:
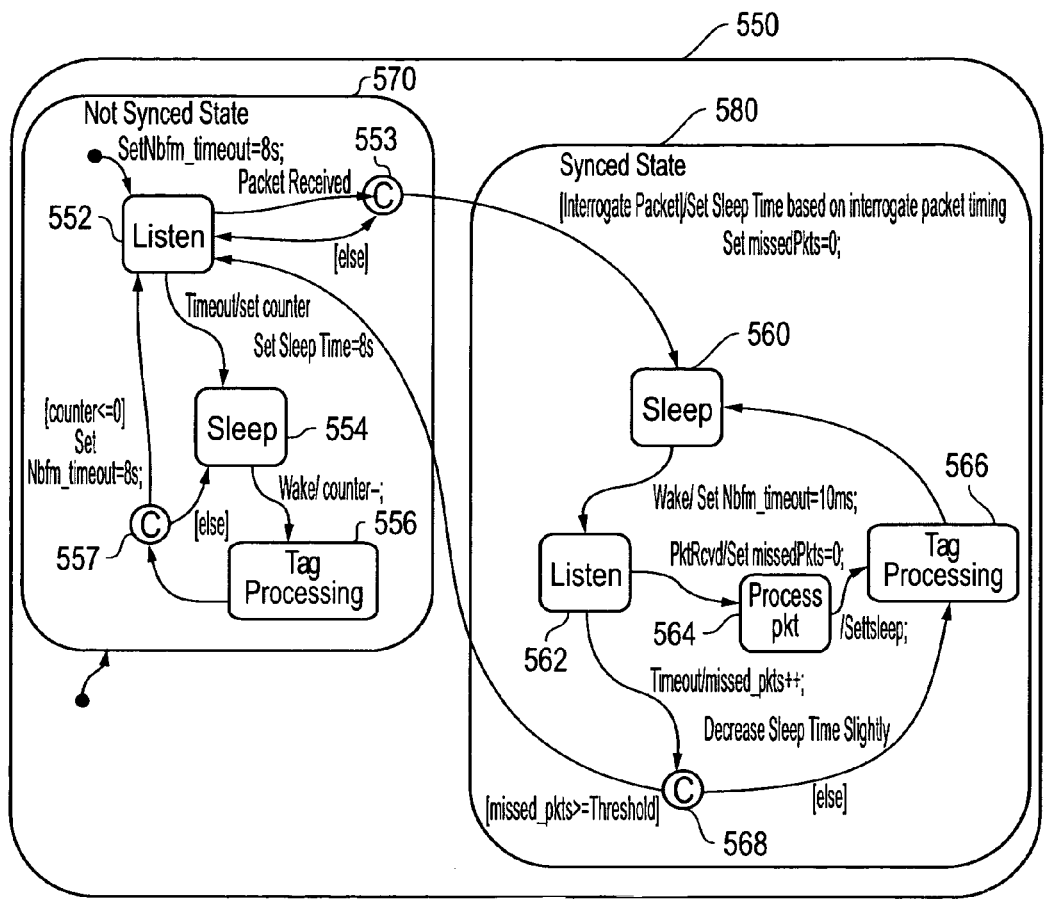
FIG. 5 is a statechart illustrating methodology according to one exemplary embodiment of the disclosed systems and methods.
Figure 5:
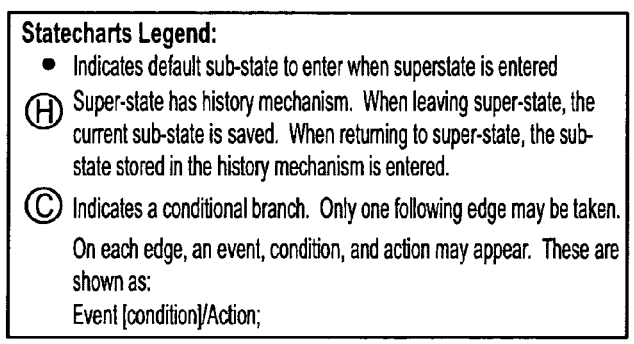

FIG. 5 is a statechart diagram that illustrates one exemplary embodiment of methodology 550 that may be employed to keep an aRFID tag 180 in synchronization (while minimizing tag power consumption) with an aRFIDI system 190 such as found in aRFID communication system 100 illustrated and described herein. In methodology 550 of FIG. 5, an aRFID tag 180 initially starts out in a non-synchronized ("Not Synced") state 570 (i.e., aRFID tag 180 is not in synchronization with aRFIDI system 190). In this non-synchronized state 570, aRFID tag 180 attempts to receive its first NBFM interrogator (polling) packet from aRFIDI system 190 in step 552, where it listens for a NBFM polling packet for a predefined non-synchronized tag listening time "Nbfm_timeout" set when entering step 552. In one exemplary embodiment, tag listening time may be set to be 8 seconds or other predefined time period that corresponds to the total polling time or revisit rate of an associated aRFIDI system to ensure that opportunity is given for aRFID tag 180 to be listening in step 552 at the same time the aRFIDI system transmits a NBFM polling packet. In this regard, a total polling time of aRFIDI system 190 of FIG. 1 may be 8 seconds in one exemplary embodiment, with one second being allocated to consecutively scan each of eight 45° sector coverage areas 110, 112, 114, 116, 118, 120, 122 and 124 as previously described herein. However, a tag listening time may be set to any other value that is desired or needed to fit the characteristics of a given application and/or aRFIDI system/s.

If a NBFM polling packet is found to be received in conditional step 553, then aRFID tag 180 now enters a synchronized state 580 with aRFIDI system 190 and goes to step 560 where methodology 500 proceeds in a manner that will be described further below. On the other hand, if in conditional step 553 no polling packet is found received during the predefined "Timeout" listening time of step 552, then aRFID tag 180 proceeds to step 554 where aRFID tag 180 enters a timed low power sleep mode (during which NBFM transceiver circuitry 406 remains off) and sets an non-synchronized sleep timer "SetSleepTime" so that aRFID tag 180 sleeps for a predefined time that may also correspond to the polling rate of aRFIDI system 190 (e.g., 8 seconds in this example). At the same time step 554 is entered, a counter is set to equal a predefined maximum number of consecutive sleep cycles (e.g., 450 sleep cycles or other predefined number of sleep cycles). Such a non-synchronized state 570 may exist, for example, when aRFID tag 180 is not within range of an interrogator system 190, when an interrogator system 190 is not active (e.g., such as when undergoing maintenance or due to power failure), or due to transmission problems such as lost packets, multi-path problems, etc. In such a case, 450 sleep cycles at 8 seconds per sleep cycle would yield a total time of 3600 seconds or one hour down time between required NBFM transceiver power up intervals for listening in step 552, resulting in reduced power consumption while aRFID tag 180 is in a non-synchronized state with an interrogator system 190, while at the same time allowing normal tag processing operations to be carried out.

Still referring to FIG. 5, once aRFID tag 180 proceeds to non-synchronized sleep timer of step 554, aRFID tag 180 goes into low power sleep mode and continues to wake every predefined time period (e.g., 8 seconds) to function independently (i.e., without synchronization with aRFIDI system 190) by moving from step 554 to step 556 and performing tag processing operations in step 556 (e.g., data processing, UWB response signal transmission, gathering data from sensors, etc.) before returning through conditional step 557 to step 554 to sleep for another predefined time, and then waking up again to proceed to step 556 for tag processing operations again. In conditional step 557, the value of the maximum sleep cycle counter is evaluated to determine if it is less than or equal to zero. In this regard, the maximum sleep cycle counter is decremented by an amount of one each time aRFID tag 180 exits step 554 so that after cycling between steps 554, 556 and 557 for the predefined maximum number of sleep cycles, the maximum sleep cycle counter value becomes equal to zero. During the time that aRFID tag 180 cycles between steps 554, 556 and 557 in non-synchronized state 570 with a maximum sleep counter value greater than zero in step 557, no attempt is made to listen for NBFM polling packets and NBFM transceiver circuitry 406 remains off, thus saving power consumption. But when the maximum sleep cycle counter is found to be equal to a value less than or equal to zero in step 557, the "Nbfm_timeout" is set again to 8 seconds and methodology 550 returns to listen step 552 where NBFM transceiver circuitry 406 is activated for a short period of time and another attempt is again made to receive a first NBFM polling packet from aRFIDI system 190. The steps of non-synchronized state 570 are then repeated as before.

Once a NBFM polling packet is found to have been received by aRFID tag 180 in conditional step 553 of FIG. 5, then aRFID tag 180 enters a synchronized ("Synced) state 580 with aRFIDI system 190 and proceeds to step 560 as shown. At the same time, a synchronized sleep timer "SleepTime" is set to a predefined sleep time based on received interrogator packet timing as will be described further below and a missed packets counter "missedPkts" is initially set to equal zero. In step 560, aRFID tag 180 enters a timed low power sleep mode and sleeps for the predefined synchronized sleep time that in one exemplary embodiment may correspond to 8 seconds minus a receive buffer (typically 2 milliseconds) minus the time since receipt of the last interrogate packet (the time used for other tag functions, e.g., typically a few milliseconds) resulting in a set sleep time of slightly less than 8 s seconds in this exemplary embodiment. After entering the low power sleep mode, aRFID tag 180 will wake after the set synchronized sleep time and listen in step 562 for NBFM polling packets for a predefined synchronized time "Nbfm_timeout" (e.g., 10 milliseconds or other predefined time period).

In most cases, aRFID tag 180 will receive a polling packet in listening mode step 562 within a short receive buffer time (e.g., from about 2 to about 3 milliseconds). Assuming aRFID tag 180 successfully receives a NBFM polling packet from aRFIDI system 190 as expected, the missed packet counter "missedPkts" is set to zero and aRFID tag 180 processes the received NBFM polling packet in step 564 (e.g., completing tasks as requested by the interrogator, including sending out UWB packets, activating tag LED, changing data rates, etc.). At the same time, the sleep timer may be dynamically adjusted in real time (e.g., increased or decreased) again based on received packet timing (e.g., by refining the sleep time used in order to maintain the desired receive buffer time of about 2 milliseconds; this refining may be based on the actual time between when the tag wakes and the receipt of an interrogator packet). Then aRFID tag 180 continues with whatever tag processing operations are necessary in step 566 (e.g., data processing, UWB response signal transmission, gathering data from sensors, etc.). After the tag processing operations are complete, aRFID tag 180 returns as shown to step 560, where aRFID tag 180 once again enters the timed low power sleep mode and sleeps for the predefined synchronized sleep time in the manner previously described.

However, if a NBFM polling packet is not received in step 562 before the "Nbfm_timeout" value is reached, then the aRFID tag 180 increments the packet missed counter "missedPkts" by one, and the synchronized sleep time is dynamically decreased in real time (e.g., slightly by about 3 milliseconds). This adjustment may be made to cover the event that aRFID tag 180 woke just after transmission of the NBFM interrogator (polling) packet. Methodology 550 then proceeds to conditional step 568 where the value of the missed packet counter "missed_pkts" is evaluated to see if it meets or exceeds a predefined threshold value of missed packets (e.g., five missed packets or other predefined number of missed packets). If the value of the "missed_pkts" counter is found in step 568 not to meet or exceed the predefined threshold number of missed packets, then aRFID tag 180 proceeds to tag processing operations of step 566 (e.g., data processing, UWB response signal transmission, gathering data from sensors, etc.) in a manner as previously described. However, if in step 568 the value of the "missed_pkts" counter is found to meet or exceed the predefined threshold number of missed packets, then it is assumed that aRFID tag 180 has lost synchronization with aRFIDI system 190, and aRFID tag 180 returns to non-synchronized state 570 where it enters step 552 and listens for a NBFM interrogator (polling) packet in a manner as previously described herein.

Returning now to FIG. 1, each of UWB receiver antennas 160 are configured to receive the UWB response signal transmissions from each of aRFID tags 180, and are coupled to provide the received signals and time of UWB response signal reception at each antenna 160 to a data processing system (e.g., UWB processing system 500 in this exemplary embodiment) for signal processing tasks such as tag tracking, localization and/or decoding of information (e.g., monitored environmental or object information from sensor circuitry) transmitted from a given aRFID tag 180 in a UWB response signal.

Figure 6:
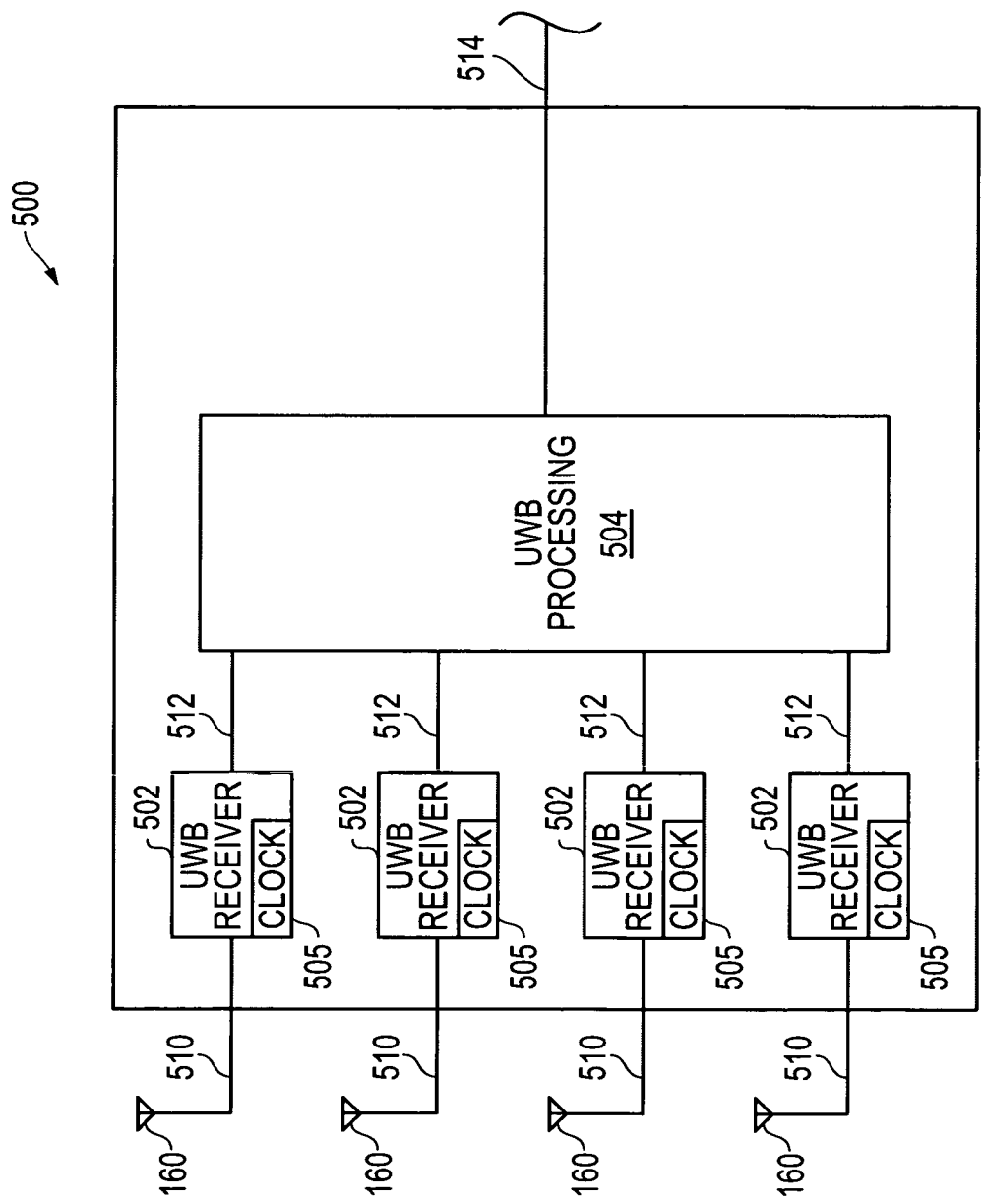
FIG. 6 is a block diagram of a UWB processing system according one exemplary embodiment of the disclosed systems and methods.

FIG. 6 illustrates one exemplary embodiment of a UWB processing system 500 that may be coupled to the four UWB receiver antennas 160 of known location that were previously illustrated and described in relation to FIG. 1. It will be understood that although four or more UWB receiver antennas 160 may be employed to determine the three-dimensional position of a transmitting aRFID by multilateration or hyperbolic positioning, fewer than four UWB receiver antennas 160 may be alternatively employed in other embodiments where three dimensional location determination is not required. Thus, three UWB receiver antennas 160 may be employed to allow two-dimensional determination of the location of a given transmitting aRFID tag 180 based on time difference of arrival (TDOA) methodology. In other embodiments, one or two UWB receiver antennas 160 maybe employed, e.g., where only transmitting information from an aRFID tag 180 via UWB communications and/or where aRFID tag location is determined based only partially on the TDOA between two UWB receiver antennas 160.

Still referring to FIG. 6, each of UWB receivers 502 has a system clock 505 that is synchronized with the one pulse per second output from an associated GPS receiver, although a local clock may be employed in other embodiments (e.g., atomic clock, or local clock that is synchronized with system clocks of other UWB receivers 502 using any suitable synchronization methodology). As so configured, each receiver can maintain its own highly accurate clock for time tagging of the received UWB signal. The time of receipt of a given UWB response signal transmission 510 from a given aRFID tag 180 at each of the four different UWB receivers 502 is measured by the synchronized system clock 505 of each receiver 502 and communicated via digital receiver data signal 512 (along with any sensor data or other information contained in the UWB response signal) to UWB processing circuitry 504 of UWB processing system 500. UWB processing system 500 may be, for example, a microprocessor or other type of processing device/s that is suitable for performing time difference of arrival (TDOA) calculations and/or other processing tasks on the UWB response signal (and information contained therein) that is received by UWB receivers 502. Assuming that the given aRFID tag 180 (i.e., that is transmitting the given UWB response signal) is not located at an unfavorable geometry from each of the four UWB antennas 160, then there will be difference in time of arrival of the UWB response signal at each UWB receiver 160 relative to each other. UWB processing circuitry 504 may be configured to calculate the current three-dimensional location in x,y,z coordinates relative to the known x,y,z coordinate locations of each of the four different UWB receivers 502, and to output this calculation as digital processed tag information 514 (e.g., tag location coordinates, collected and/or processed sensor information, etc.) for storage, display and/or further processing.

UWB processing circuitry 504 may calculate the current three-dimensional location of a transmitting aRFID tag 180 using any suitable multilateration or hyperbolic positioning methodology. For example, in one exemplary embodiment, given a transmitting aRFID tag 180 at an unknown location $(x_t, y_t, z_t)$ and four UWB receivers 502 at known locations A, B, C and D (expressed coordinates as $(X_A, Y_A, Z_A)$, $(X_B, Y_B, Z_B)$, $(X_C, Y_C, Z_C)$, and $(X_D, Y_D, Z_D)$), the travel time (T) of pulses from an aRFID tag 180 located at (x,y,z) to each of the UWB receivers 502 is the distance divided by the pulse propagation rate (c) (e.g., speed of light) as follows:

$$T_A = \frac{1}{c}\left(\sqrt{(x_t - x_A)^2 + (y_t - y_A)^2 + (z_t - z_A)^2}\right)$$

$$T_B = \frac{1}{c}\left(\sqrt{(x_t - x_B)^2 + (y_t - y_B)^2 + (z_t - z_B)^2}\right)$$

$$T_C = \frac{1}{c}\left(\sqrt{(x_t - x_C)^2 + (y_t - y_C)^2 + (z_t - z_C)^2}\right)$$

$$T_D = \frac{1}{c}\left(\sqrt{(x_t - x_D)^2 + (y_t - y_D)^2 + (z_t - z_D)^2}\right)$$

Taking the UWB receiver location D as the coordinate system origin, then:

$$T_D = \frac{1}{c}\left(\sqrt{x_t^2 + y_t^2 + z_t^2}\right)$$

and the TDOA between a UWB response signal arriving at UWB receiver location A and the other UWB receiver locations A, B & C is:

$$T_A = T_A - T_D$$
$$= \frac{1}{c}\left(\sqrt{(x_t - x_A)^2 + (y_t - y_A)^2 + (z_t - z_A)^2} - \sqrt{x_t^2 + y_t^2 + z_t^2}\right)$$

$$T_B = T_B - T_D$$
$$= \frac{1}{c}\left(\sqrt{(x_t - x_B)^2 + (y_t - y_B)^2 + (z_t - z_B)^2} - \sqrt{x_t^2 + y_t^2 + z_t^2}\right)$$

$$T_C = T_C - T_D$$
$$= \frac{1}{c}\left(\sqrt{(x_t - x_C)^2 + (y_t - y_C)^2 + (z_t - z_C)^2} - \sqrt{x_t^2 + y_t^2 + z_t^2}\right)$$

Each equation defines a separate hyperboloid, and the location of the transmitting UWB receiver 160 ($x_t$, $y_t$, $z_t$) may be solved for in real time.

In one exemplary embodiment, the unknown location of a transmitting RFID tag 180 may be located (i.e., geolocated) using any suitable TDOA technique with the optional addition of a reference emitter that is transmitting at a known location in order to increase the accuracy of the location value determined using the selected TDOA technique, assist with receiver clock calibration, etc.

In the practice of the disclosed systems and methods, the exemplary aRFID communication system 100 of FIG. 1 may be successfully applied, for example, to a typical cattle feedlot scenario which has greater than 100,000 tagged head of cattle roaming in a 2 square mile area. Such an aRFID tag density would be far out of reach of the capabilities of conventional aRFID systems currently available today. However, by utilizing sector interrogation and receiver channelization, this aRFID tag density scenario is manageable using the disclosed systems and methods. In this regard, UWB receiver is capable of processing up to 10,000 tag transmissions per second without any other additional density management means. With a standard update rate for a given tag set to 8 seconds, a UWB receiver that is capable of processing 10,000 tag transmissions per second is employed for such a 100,000 tag scenario. Thus, in one exemplary embodiment, the maximum achievable tag density for a UWB receiver is only limited by the number of tags transmitting on UWB during any one second time, which is then controlled by using the aRFIDI system 190.

Figure 7:
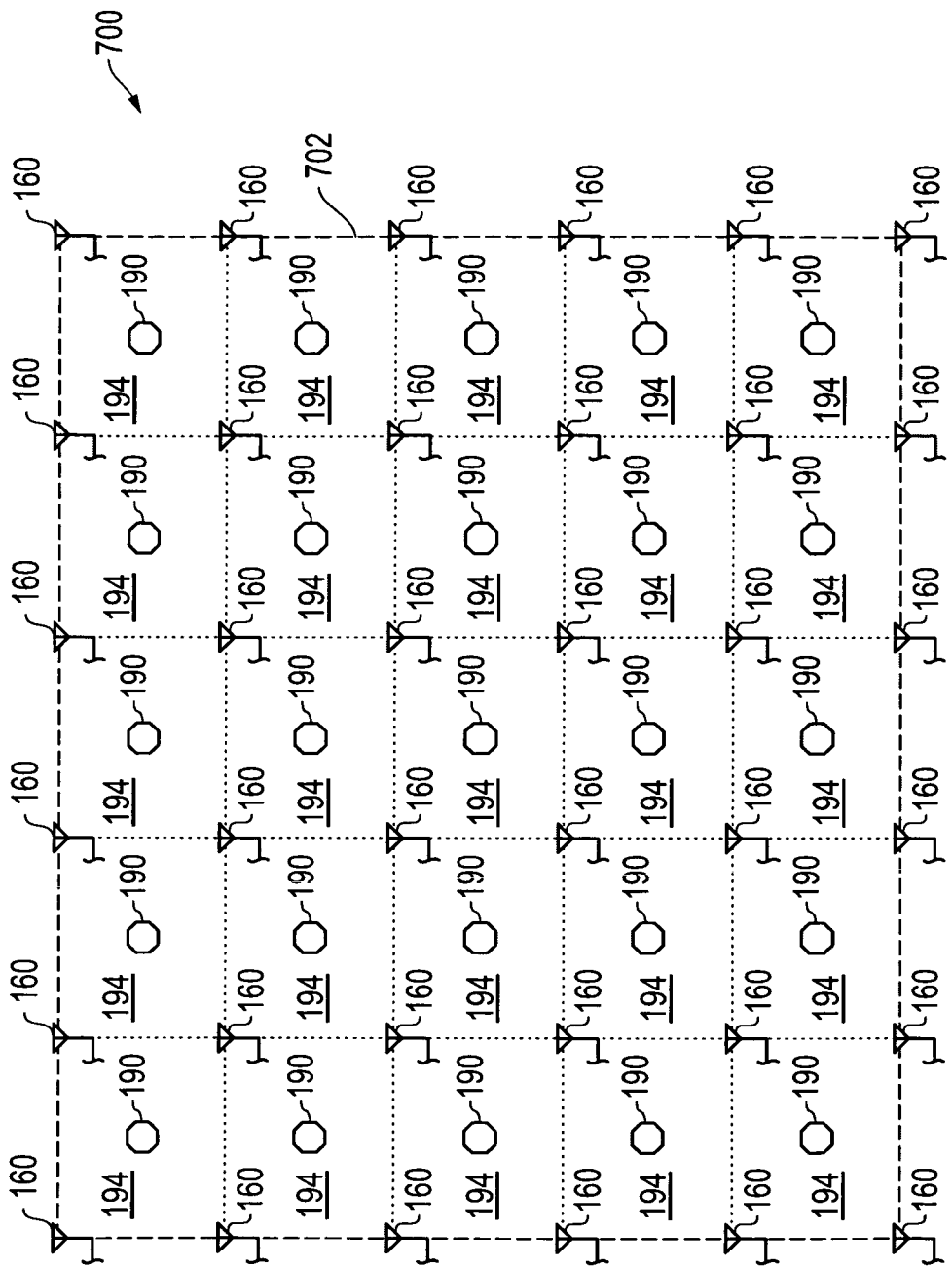
FIG. 7 shows an aRFID communication system according to one exemplary embodiment of the disclosed systems and methods.

FIG. 7 illustrates one alternative exemplary embodiment of an aRFID communication system 700 having an aggregate coverage area 702 that is made up of 25 smaller master coverage areas 194 that are each defined by multiple aRFIDI systems 190 and a network of 36 UWB receiver antennas 160 as shown. Each aRFIDI system 190 and its four adjacent UWB receiver antennas 160 of a given master coverage area 194 may operate to track and otherwise communicate with aRFID tags 180 in a manner similar to that described herein in relation to FIGS. 1-6. As shown, each master coverage area 194 of FIG. 7 shares a pair of UWB receiver antennas 160 with at least one adjacent master coverage area 194, such that a given UWB receiver antenna 160 may receive UWB broadcasts from aRFID, tags 180 that are located in two or more adjacent master coverage areas 194. Each of multiple UWB receiver antennas 160 may be coupled (e.g., via a data network) to a common UWB processing system 500 that receives and processes all UWB response signal transmissions received from aRFID tags 180 at any of multiple UWB receiver antennas 160 of aRFID communication system 700, in a manner that will be described further in relation to FIG. 8.

Still referring to FIG. 7, although dotted lines are shown to differentiate individual master cover areas 194, it will be understood that no physical boundaries may exist between each of the master coverage areas 194, e.g., so that individual aRFID tags 180 may freely roam from one master coverage area 194 to another adjacent master coverage area 194 within aggregate coverage area 702. When implementing such an aggregate coverage area 702 using multiple smaller master coverage areas 194, it may be desirable to position individual aRFIDI systems 190 of the master coverage areas 194 close enough together such that there is overlap in the NBFM polling transmission range between adjacent master coverage areas 194, i.e., to ensure that there are no NBFM polling "dead" spots within the aggregate coverage area 702.

It will be understood that individual aRFID tags may at some times be positioned such that they are in first band signal communication range of more than one aRFIDI system 190 of the embodiment of FIG. 7 (e.g., when located near a boundary between two adjacent master coverage areas 194). In such a case, the methodology described and illustrated in relation to FIG. 5 herein may be employed in one exemplary embodiment by such an individual aRFID tag 180 to keep it synchronized with a single one of multiple aRFIDI systems 190 that may be in first band signal communication range with the given aRFIDI tag 180. In this regard, when the individual aRFID tag 180 first receives a NBFM polling packet from one of multiple in-range aRFIDI systems 190, it uses the methodology of FIG. 5 to enter a synchronized state 580 with that first given aRFIDI system 190 such that the aRFID tag 180 sleeps for a predefined time that corresponds to the polling rate of the first given aRFIDI system 190. Therefore, in this synchronized state, the given aRFID tag 180 does not receive or act upon polling signals received from other in-range aRFIDI systems 190 since the polling rates of adjacent aRFIDI systems 190 are not synchronized with each other in this exemplary embodiment. If the given aRFID tag 180 loses signal communications with the first aRFIDI system 190 then it may resynchronize with another or second in-range aRFIDI system 190 using the methodology of FIG. 5.

One example of an application for such an aRFID communication system 700 is a large cattle ranch where tagged cows or other types of tagged livestock or wildlife may be tracked in real time cross country on the ranch. For example, assuming that each of square-shaped master coverage areas 194 of FIG. 7 are four miles across in dimension (10,240 acres), an aggregate coverage area 702 of 20 miles across (256,000 acres) may be established for tracking freely roaming aRFID tags 180 therein. Other example applications include, but are not limited to, large areas of rural and/or urban landscapes. In this regard, an aRFID communication system 700 having an aggregate coverage area made up of multiple smaller master coverage areas 194 may be used to monitor and track movement of tagged goods or vehicles across a national or state highways (e.g., such as movement of trucked cargo, road maintenance vehicles, law enforcement vehicles, etc.), for example, using cell towers, utility poles or signs as platforms for aRFIDI systems 190 and UWB receiver antennas 160. In another example, tagged goods within a warehouse or multiple warehouses located in an urban landscape (e.g., section of a city) may be tracked in real time using a grid of master coverage areas 194 that are laid out on a city block or larger basis, e.g., using towers or pre-existing local building tops as mounting platforms for aRFIDI systems 190 and UWB receiver antennas 160. In such an implementation, movement of goods within the aggregate coverage area 702 formed by the multiple master coverage areas 194 may be tracked in real time, e.g., movement of cargo inside one or more warehouse/s, movement of cargo into or out from a warehouse on trucks, etc. Such an implementation may be used to alternatively or additionally track any other types of objects, e.g., police vehicles, delivery vans, school buses, etc.

Further information on possible tracking applications that may be implemented using embodiments of the disclosed systems and methods may be found, for example, in concurrently filed provisional U.S. Patent Application Ser. No. 61/215,210, entitled "RFID SYSTEMS AND METHODS" by Ken A. Stroud, et. al., which is filed on the same date as the present application and which is incorporated herein by reference in its entirety.

Figure 8:
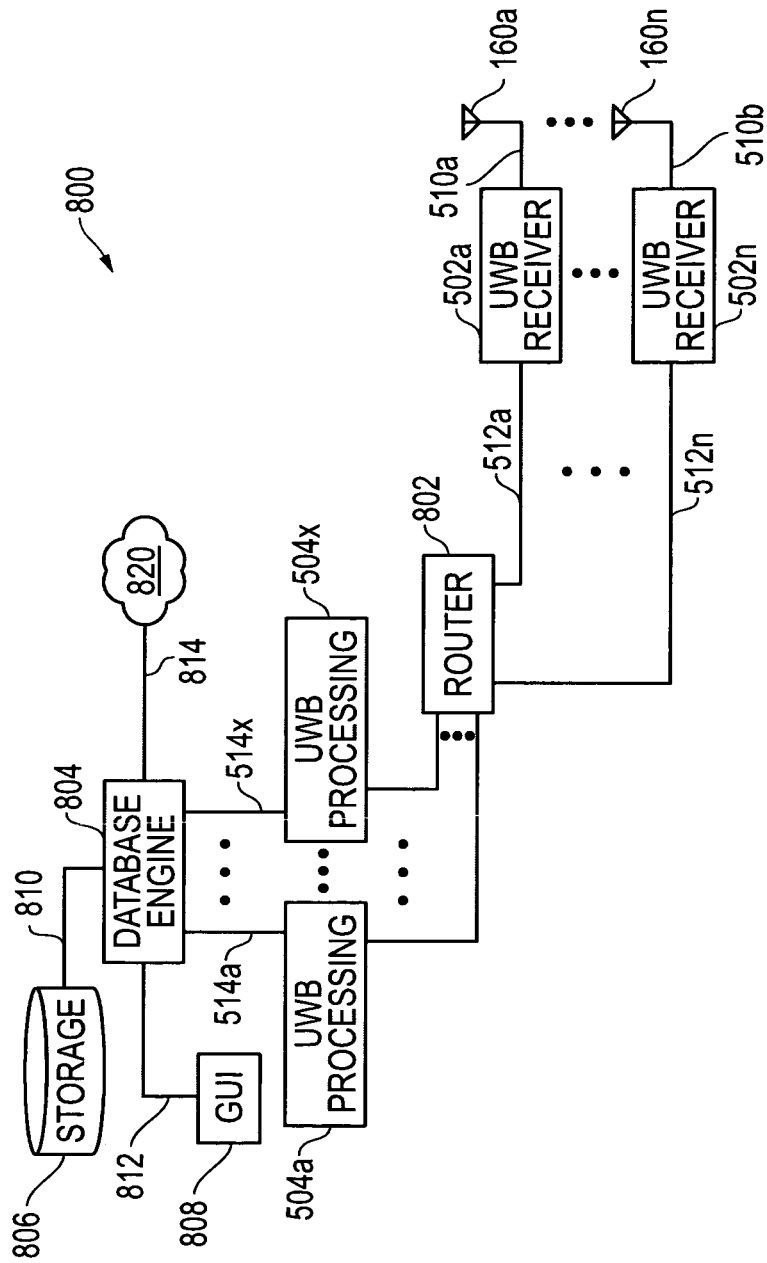
FIG. 8 is a block diagram of UWB data processing network system according to one exemplary embodiment of the disclosed systems and methods.

FIG. 8 is a block diagram of one exemplary embodiment of a data processing network system (e.g., UWB data processing network system 800 in this embodiment) that may be employed to perform real time tracking of aRFID tags 180 that exist in an aggregate coverage area environment that includes multiple master coverage areas, for example, such as illustrated and described in relation to FIG. 7. As shown in FIG. 8, router circuitry 802 may be provided and coupled to receive digital receiver data signals 512a to 512n from each of corresponding UWB receivers 502a to 502n that are in turn coupled to receive UWB response signal transmissions 510a to 510n via respective. UWB receiver antennas 160a to 160n, in a manner similar to described in relation to the single master coverage area embodiment of FIG. 6. UWB receiver antennas 160a to 160n each may correspond to one of the 36 UWB receiver antennas illustrated in FIG. 7 (i.e., n=36). Router circuitry 802 is also shown coupled to data processing circuitry components (e.g., UWB processing circuitries 504a to 504x in this embodiment), which each may correspond to one of the 25 master coverage areas of FIG. 7 (i.e., x=25) and which may each perform similar processing tasks as UWB processing circuitry 504 of FIG. 6. Router circuitry 802 in turn operates to route four selected digital receiver data signals 512 (i.e., selected from digital receiver data signals 512a to 512n) corresponding to one of the 25 master coverage areas 194 of FIG. 7 to one of the UWB processing circuitry components 504a to 504x, e.g., based on source and/or destination information contained in the packet headers of data signals 512. Thus, each one of UWB processing circuitry components 504a to 504x is configured to correspond to one of the 25 master coverage areas 194 of FIG. 7, and to perform multilateration or hyperbolic positioning calculations (and/or other data processing operations) for its corresponding master coverage area 194.

Still referring to FIG. 8, each of UWB processing circuitry components 504a to 504x provides respective digital processed tag information 514a to 514x (e.g., tag location coordinates, collected and/or processed sensor information, etc.) to database engine circuitry 804 which may be, for example, a personal computer, server, etc. In this regard, each one of signals 514a to 514x corresponds to processed tag information for a given respective one of master coverage areas 194. Database engine circuitry 804 may include one or more processors and other hardware configured to provide display signals 812 to one or more display device/s 808, e.g., to implement a graphical user interface (GUI) on display device/s 808 that allows a user to interact with database engine 804 for tasks such as historical and real-time tracking of locations of individual aRFID tags 180, viewing and manipulating collected tag-related sensor data, etc.

As shown in FIG. 8, database engine circuitry 804 may also be coupled to one or more storage device/s 806 (e.g., magnetic or optical disk drives, solid state memory, etc.) for storing tag information 810, such as past tag location coordinates and reported sensor data. An optional network connection 814 may be provided to allow access to database engine 804 to users across a network 820, e.g., external public access network such as the Internet, internal corporate or government network, etc. In one exemplary embodiment, network access may be so provided so that particular users are given the ability to access particular types of data and/or data from particular aRFID tags 180 or master coverage areas 194, without the ability to access other types of data and/or data from other aRFID tags 180 or other master coverage areas 194. In this way, information from aRFID tags 180 that are associated with different types of objects and/or located in different master coverage areas 194 may be monitored in a common aggregate coverage area 702, but information associated therewith may be selectively monitored or retrieved by different users, e.g., different customers of the operator of an aRFID communication system 700 having an aggregate coverage area 702 such as illustrated and described in relation to FIG. 7. It is also possible that similar selective data access may be provided for individual users of an aRFID communication system 100 having a single master cover area 194 such as illustrated and described in relation to FIG. 1.

It will be understood that one or more of the tasks, functions, or methodologies described herein may be implemented, for example, as firmware or other computer program of instructions embodied in a tangible computer readable medium that is executed by a CPU, microcontroller, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of operating a radio frequency identification (RFID) tag within a radio frequency identification (RFID) communication environment, comprising:
   providing at least one RFID tag configured to receive periodic first band RF signal interrogator polling signals and configured to transmit second band RF signal response signals in response thereto, the first band being a multiple channel-based frequency band and the second band being a non-channel based frequency band; and
   repeatedly and alternately performing the following two steps:
      operating the RFID tag in a timed low power sleep mode for a predefined sleep time during which the RFID tag does not listen for transmitted first band RF signal interrogator polling signals, and
      then waking the RFID tag to operate in a timed powered up listening mode for a predefined tag listening time without first transmitting from the RFID tag, the RFID tag actively listening for transmitted first band RF signal interrogator polling signals during the listening mode; and
   wherein the method further comprises further comprising dynamically adjusting the length of the predefined sleep time before again waking the RFID tag to listening mode based upon at least one of the time of receipt of a periodic interrogator polling signal during the listening mode, the non-receipt of a periodic polling signal during the listening mode, or a combination thereof.

2. The method of claim 1, wherein the method further comprises dynamically adjusting the length of the predefined sleep time in at least one of the following manners:

receiving a periodic interrogator polling signal at the RFID tag at a given receipt time while the RFID tag is operating in the listening mode and increasing or decreasing the length of the predefined sleep time based on the given receipt time of the interrogator polling signal as necessary to maintain a predefined alignment time between the start time of the listening mode and the given receipt time of the latest periodic interrogator polling signal, not receiving an interrogator polling signal at the RFID tag while the RFID tag is operating in the listening mode and decreasing the length of the predefined sleep time by an incremental amount of time before again operating the RFID tag in listening mode, or a combination thereof.

3. The method of claim 1, wherein the method further comprises dynamically adjusting the length of the predefined sleep time by receiving a periodic interrogator polling signal at the RFID tag at a given receipt time while the RFID tag is operating in the listening mode and increasing or decreasing the length of the predefined sleep time based on the given receipt time of the interrogator polling signal as necessary to maintain a predefined alignment time between the start time of the listening mode and the given receipt time of the latest periodic interrogator polling signal.

4. The method of claim 1, wherein the first band is a narrow band frequency modulation (NBFM) frequency band; and wherein the second band is an ultra-wideband (UWB) frequency band.

5. A method of operating a radio frequency identification (RFID) tag within a radio frequency identification (RFID) communication environment, comprising:

providing at least one RFID tag configured to receive periodic first band RF signal interrogator polling signals and configured to transmit second band RF signal response signals in response thereto, the first band being a multiple channel-based frequency band and the second band being a non-channel based frequency band; and repeatedly and alternately performing the following two steps:

operating the RFID tag in a timed low power sleep mode for a predefined sleep time during which the RFID tag does not listen for transmitted first band RF signal interrogator polling signals, and then waking the RFID tag to operate in a timed powered up listening mode for a predefined tag listening time without first transmitting from the RFID tag, the RFID tag actively listening for transmitted first band RF signal interrogator polling signals during the listening mode; and wherein the method further comprises dynamically adjusting the length of the predefined sleep time before again waking the RFID tag to the listening mode; and wherein the method further comprises dynamically adjusting the length of the predefined sleep time to maintain a predefined receive buffer time; wherein the predefined receive buffer time represents the latest time elapsed between the time of waking the RFID tag to operate in a timed powered up listening mode and the time of receipt of a first interrogator packet thereafter without first transmitting from the RFID tag.

6. A method of operating a radio frequency identification (RFID) tag within a radio frequency identification (RFID) communication environment, comprising:

providing at least one RFID tag configured to receive periodic first band RF signal interrogator polling signals to transmit second band RF signal response signals in response thereto, the first band being a multiple channel-based frequency band and the second band being a non-channel based frequency band; and repeatedly and alternately performing the following two steps:

operating the RFID tag in a timed low power sleep mode for a predefined sleep time during which the RFID tag does not listen for transmitted first band RF signal interrogator polling signals, and then waking the RFID tag to operate in a timed powered up listening mode for a predefined tag listening time during which the RFID tag actively listens for transmitted first band RF signal interrogator polling signals;

wherein the method further comprises dynamically adjusting the length of the predefined sleep time before again waking the RFID tag to the listening mode;

wherein the method further comprises operating the RFID tag in a synchronized state with periodic interrogator signals by repeatedly and alternately performing the following steps:

operating the RFID tag in a timed synchronized low power sleep mode for a predefined synchronized sleep time during which the RFID tag does not listen for transmitted first band RF signal interrogator polling signals, then waking the RFID tag to operate in a timed powered up synchronized listening mode for a predefined synchronized tag listening time during which the RFID tag actively listens for transmitted first band RF signal interrogator polling signals, wherein the method further comprises performing the following steps if an interrogator polling signal is received during a given synchronized listening mode:

processing the latest received interrogator polling signal, performing one or more tag processing operations, increasing or decreasing the length of the predefined synchronized sleep time based on the given receipt time of the interrogator polling signal as necessary to maintain a predefined alignment time between the start time of the synchronized listening mode and the given receipt time of the periodic interrogator polling signal, and returning the RFID tag to the timed synchronized low power sleep mode for the predefined synchronized sleep time; and wherein the method further comprises performing the following steps if an interrogator polling signal is not received during a given synchronized listening mode:

decreasing the length of the predefined synchronized sleep time by an incremental amount of time, performing one or more tag processing operations, and returning the RFID tag to the timed synchronized low power sleep mode for the predefined synchronized sleep time if the number of consecutive times that an interrogator polling signal has not been received is less than a predefined threshold, or operating the RFID tag in a non-synchronized state with any periodic interrogator polling signals if the number of consecutive times that an interrogator polling signal has not been received is greater than a predefined threshold.

7. The method of claim 6, wherein the duration of the predefined synchronized tag sleep time is less than a predefined value of the frequency of the interrogator polling signals.

8. The method of claim 7, wherein the duration of the predefined synchronized tag sleep time is substantially equal to a predefined value of the frequency of the interrogator polling signals less a predefined receive buffer value and less the time for signal and tag processing operations.

9. The method of claim 6, wherein operating the RFID tag in a non-synchronized state with any periodic interrogator polling signals comprises repeatedly and alternately performing the following steps:

operating the RFID tag in a timed non-synchronized low power sleep mode for a predefined non-synchronized sleep time during which the RFID tag does not listen for transmitted first band RF signal interrogator polling signals;

then waking up the RFID tag to perform one or more tag processing operations;

then returning the RFID tag to the timed non-synchronized low power sleep mode for the predefined non-synchronized sleep time if the number of immediately previous consecutive sleep times is less than a predefined threshold, or operating the RFID tag in a timed powered up non-synchronized listening mode for a predefined non-synchronized tag listening time during which the RFID tag actively listens for transmitted first band RF signal interrogator polling signals if the number of immediately previous consecutive sleep times is greater than or equal to a predefined threshold.

10. The method of claim 9, wherein the duration of the predefined non-synchronized tag listening time is greater than or equal to a predefined value of the frequency of the interrogator polling signals.

11. The method of claim 9, further comprising then again operating the RFID tag in the synchronized state upon receipt of a periodic interrogator polling signal during the non-synchronized tag listening time of the non-synchronized listening mode.

12. A frequency identification (RFID) tag system, comprising:

first band receiver or transceiver circuitry configured to receive periodic first band RF signal interrogator polling signals and second band transmitter circuitry configured to transmit second band RF signal response signals in response thereto, the first band being a multiple channel-based frequency band and the second band being a non-channel based frequency band; and at least one processing device to repeatedly and alternately perform the following two steps:

operate the circuitry of the RFID tag in a timed low power sleep mode for a predefined sleep time during which the first band receiver or transceiver circuitry does not listen for transmitted first band RF signal interrogator polling signals, then wake up circuitry of the RFID tag to operate in a timed powered up listening mode for a predefined tag listening time without first transmitting from the RFID tag, which the first band receiver or transceiver circuitry actively listening for transmitted first band RF signal interrogator polling signals during the listening mode, and dynamically adjust the length of the predefined sleep time before again waking circuitry of the RFID tag to the listening mode;

wherein the at least one processing device is further configured to dynamically adjust the length of the predefined sleep time before again waking the first band receiver or transceiver circuitry to listening mode based upon at least one of the time of receipt of a periodic interrogator polling signal during the listening mode, the non-receipt of a periodic polling signal during the listening mode, or a combination thereof.

13. The system of claim 12, wherein the at least one processing device is further configured to dynamically adjust the length of the predefined sleep time in at least one of the following manners:

increasing or decreasing the length of the predefined sleep time based on the given receipt time of the interrogator polling signal while the RFID tag is operating in the listening mode as necessary to maintain a predefined alignment time between the start time of the listening mode and the given receipt time of the latest periodic interrogator polling signal, decreasing the length of the predefined sleep time by an incremental amount of time before again operating the RFID tag in listening mode upon not receiving an interrogator polling signal at the RFID tag while the RFID tag is operating in the listening mode, or a combination thereof.

14. The system of claim 12, wherein the first band is a narrow band frequency modulation (NBFM) frequency band; and wherein the second band is an ultra-wideband (UWB) frequency band.

15. The system of claim 12, wherein the at least one processing device is further configured to dynamically adjust the length of the predefined sleep time by increasing or decreasing the length of the predefined sleep time based on the given receipt time of the interrogator polling signal while the RFID tag is operating in the listening mode as necessary to maintain a predefined alignment time between the start time of the listening mode and the given receipt time of the latest periodic interrogator polling signal.

16. A frequency identification (RFID) tag system, comprising:

first band receiver or transceiver circuitry configured to receive periodic first band RF signal interrogator polling signals and second band transmitter circuitry configured to transmit second band RF signal response signals in response thereto, the first band being a multiple channel-based frequency band and the second band being a non-channel based frequency band; and at least one processing device to repeatedly and alternately perform the following two steps:

operate the circuitry of the RFID tag in a timed low power sleep mode for a predefined sleep time during which the first band receiver or transceiver circuitry does not listen for transmitted first band RF signal interrogator polling signals, then wake up circuitry of the RFID tag to operate in a timed powered up listening mode for a predefined tag listening time without first transmitting from the RFID tag, which the first band receiver or transceiver circuitry actively listening for transmitted first band RF signal interrogator polling signals during the listening mode, and dynamically adjust the length of the predefined sleep time before again waking circuitry of the RFID tag to the listening mode;

wherein the at least one processing device is further configured to dynamically adjust the length of the predefined sleep time to maintain a predefined receive buffer time; wherein the predefined receive buffer time represents the latest time elapsed between the time of waking the first band receiver or transceiver circuitry of the RFID tag to operate in a timed powered up listening mode and the time of receipt of a first interrogator packet thereafter without first transmitting from the RFID tag.

17. A frequency identification (RFID) tag system, comprising:
   first band receiver or transceiver circuitry configured to receive periodic first band RF signal interrogator polling signals and second band transmitter circuitry configured to transmit second band RF signal response signals in response thereto, the first band being a multiple channel-based frequency band and the second band being a non-channel based frequency band; and
   at least one processing device to repeatedly and alternately perform the following two steps:
      operate the circuitry of the RFID tag in a timed low power sleep mode for a predefined sleep time during which the first band receiver or transceiver circuitry does not listen for transmitted first band RF signal interrogator polling signals,
      then wake up circuitry of the RFID tag to operate in a timed powered up listening mode for a predefined tag listening time during which the first band receiver or transceiver circuitry actively listens for transmitted first band RF signal interrogator polling signals;
   wherein the at least one processing device is further configured to dynamically adjust the length of the predefined sleep time before again waking circuitry of the RFID tag to the listening mode;
   wherein the at least one processing device is further configured to operate the RFID tag in a synchronized state with periodic interrogator signals by repeatedly and alternately performing the following steps:
      operating circuitry of the RFID tag in a timed synchronized low power sleep mode for a predefined synchronized sleep time during which the first band receiver or transceiver circuitry does not listen for transmitted first band RF signal interrogator polling signals,
      then waking the circuitry of the RFID tag to operate in a timed powered up synchronized listening mode for a predefined synchronized tag listening time during which the first band receiver or transceiver circuitry actively listens for transmitted first band RF signal interrogator polling signals, performing the following steps if an interrogator polling signal is received during a given synchronized listening mode:
         processing the latest received interrogator polling signal,
         performing one or more tag processing operations,
         increasing or decreasing the length of the predefined synchronized sleep time based on the given receipt time of the interrogator polling signal as necessary to maintain a predefined alignment time between the start time of the synchronized listening mode and the given receipt time of the periodic interrogator polling signal, and
         returning the RFID tag to the timed synchronized low power sleep mode for the predefined synchronized sleep time; and
      performing the following steps if an interrogator polling signal is not received during a given synchronized listening mode:
         decreasing the length of the predefined synchronized sleep time by an incremental amount of time,
         performing one or more tag processing operations, and
         returning circuitry of the RFID tag to the timed synchronized low power sleep mode for the predefined synchronized sleep time if the number of consecutive times that an interrogator polling signal has not been received is less than a predefined threshold, or operating the RFID tag in a non-synchronized state with any periodic interrogator polling signals if the number of consecutive times that an interrogator polling signal has not been received is greater than a predefined threshold.

18. The system of claim 17, wherein the duration of the predefined synchronized tag sleep time is less than a predefined value of the frequency of the interrogator polling signals.

19. The system of claim 18, wherein the duration of the predefined synchronized tag sleep time is substantially equal to a predefined value of the frequency of the interrogator polling signals less a predefined receive buffer value and less the time for signal and tag processing operations.

20. The system of claim 17, wherein the at least one processing device is further configured to operate the RFID tag in a non-synchronized state with any periodic interrogator polling signals comprises repeatedly and alternately performing the following steps:
   operating circuitry of the RFID tag in a timed non-synchronized low power sleep mode for a predefined non-synchronized sleep time during which the first band receiver or transceiver circuitry does not listen for transmitted first band RF signal interrogator polling signals;
   then waking circuitry of the RFID tag to perform one or more tag processing operations;
   then returning circuitry of the RFID tag to the timed non-synchronized low power sleep mode for the predefined non-synchronized sleep time if the number of immediately previous consecutive sleep times is less than a predefined threshold, or operating the RFID tag in a timed powered up non-synchronized listening mode for a predefined non-synchronized tag listening time during which the first band receiver or transceiver circuitry actively listens for transmitted first band RF signal interrogator polling signals if the number of immediately previous consecutive sleep times is greater than or equal to a predefined threshold.

21. The system of claim 20, wherein the duration of the predefined non-synchronized tag listening time is greater than or equal to a predefined value of the frequency of the interrogator polling signals.

22. The system of claim 20, wherein the at least one processing device is further configured to again operate the RFID tag in the synchronized state upon receipt of a periodic interrogator polling signal during the non-synchronized tag listening time of the non-synchronized listening mode.

23. A method of operating a radio frequency identification (RFID) tag within a radio frequency identification (RFID) communication environment, comprising:
   alternately operating at least one RFID tag between a non-synchronized state with a periodic interrogator polling signal and a synchronized state with a periodic interrogator polling signal, the RFID tag being configured to receive periodic first band RF signal interrogator polling signals and to transmit second band RF signal response signals in response thereto, the first band being a multiple channel-based frequency band and the second band being a non-channel based frequency band;

wherein in the non-synchronized state of the method comprises:
operating the RFID tag in a timed non-synchronized low power sleep mode for a predefined non-synchronized sleep time during which the RFID tag does not listen for transmitted first band RF signal interrogator polling signals,
then waking up the RFID tag to perform one or more tag processing operations,
then returning the RFID tag to the timed non-synchronized low power sleep mode for the predefined non-synchronized sleep time if the number of immediately previous consecutive sleep times is less than a predefined threshold, or operating the RFID tag in a timed powered up non-synchronized listening mode for a predefined non-synchronized tag listening time during which the RFID tag actively listens for transmitted first band RF signal interrogator polling signals if the number of immediately previous consecutive sleep times is greater than or equal to a predefined threshold; and
wherein in the synchronized state of the method comprises:
operating the RFID tag in a timed synchronized low power sleep mode for a predefined synchronized sleep time during which the RFID tag does not listen for transmitted first band RF signal interrogator polling signals,
then waking up the RFID tag to operate in a timed powered up synchronized listening mode for a predefined synchronized tag listening time during which the RFID tag actively listens for transmitted first band RF signal interrogator polling signals,
performing the following steps if an interrogator polling signal is received during a given synchronized listening mode: processing the latest received interrogator polling signal, performing one or more tag processing operations, increasing or decreasing the length of the predefined synchronized sleep time based on the given receipt time of the interrogator polling signal as necessary to maintain a predefined alignment time between the start time of the synchronized listening mode and the given receipt time of the periodic interrogator polling signal, and then returning the RFID tag to the timed synchronized low power sleep mode for the predefined synchronized sleep time, and
performing the following steps if an interrogator polling signal is not received during a given synchronized listening mode: decreasing the length of the predefined synchronized sleep time by an incremental amount of time, performing one or more tag processing operations, and then returning the RFID tag to the timed synchronized low power sleep mode for the predefined synchronized sleep time if the number of consecutive times that an interrogator polling signal has not been received is less than a predefined threshold, or then operating the RFID tag in the non-synchronized state if the number of consecutive times that an interrogator polling signal has not been received is greater than a predefined threshold.

24. The method of claim 23, wherein the first band is a narrow band frequency modulation (NBFM) frequency band; and wherein the second band is an ultra-wideband (UWB) frequency band.

25. A frequency identification (RFID) tag system, comprising:
first band receiver or transceiver circuitry configured to receive periodic first band RF signal interrogator polling signals and second band transmitter circuitry configured to transmit second band RF signal response signals in response thereto, the first band being a multiple channel-based frequency band and the second band being a non-channel based frequency band; and
at least one processing device to repeatedly and alternately operate the RFID tag between a non-synchronized state with a periodic interrogator polling signal and a synchronized state with a periodic interrogator polling signal;
wherein in the non-synchronized state the at least one processing device is configured to:
operate the first band receiver or transceiver circuitry of the RFID tag in a timed non-synchronized low power sleep mode for a predefined non-synchronized sleep time during which the first band receiver or transceiver circuitry does not listen for transmitted first band RF signal interrogator polling signals,
then wake up the first band receiver or transceiver circuitry to perform one or more tag processing operations,
then return the first band receiver or transceiver circuitry to the timed non-synchronized low power sleep mode for the predefined non-synchronized sleep time if the number of immediately previous consecutive sleep times is less than a predefined threshold, or operate the first band receiver or transceiver circuitry in a timed powered up non-synchronized listening mode for a predefined non-synchronized tag listening time during which the first band receiver or transceiver circuitry actively listens for transmitted first band RF signal interrogator polling signals if the number of immediately previous consecutive sleep times is greater than or equal to a predefined threshold; and
wherein in the synchronized state the at least one processing device is configured to:
operate the first band receiver or transceiver circuitry in a timed synchronized low power sleep mode for a predefined synchronized sleep time during which the first band receiver or transceiver circuitry does not listen for transmitted first band RF signal interrogator polling signals,
then wake the first band receiver or transceiver circuitry to operate in a timed powered up synchronized listening mode for a predefined synchronized tag listening time during which the first band receiver or transceiver circuitry actively listens for transmitted first band RF signal interrogator polling signals,
perform the following steps if an interrogator polling signal is received during a given synchronized listening mode: process the latest received interrogator polling signal, perform one or more tag processing operations and increase or decrease the length of the predefined synchronized sleep time based on the given receipt time of the interrogator polling signal as necessary to maintain a predefined alignment time between the start time of the synchronized listening mode and the given receipt time of the periodic interrogator polling signal, and then return the RFID tag to the timed synchronized low power sleep mode for the predefined synchronized sleep time, and
perform the following steps if an interrogator polling signal is not received during a given synchronized listening mode: decrease the length of the predefined synchronized sleep time by an incremental amount of time and perform one or more tag processing operations, and then return circuitry of the RFID tag to the timed synchronized low power sleep mode for the predefined synchronized sleep time if the number of consecutive times that an interrogator polling signal has not been received is less than a predefined threshold, or then operate the RFID tag in the non-synchronized state if the number of consecutive times that an interrogator polling signal has not been received is greater than a predefined threshold.

26. The system of claim 25, wherein the first band is a narrow band frequency modulation (NBFM) frequency band; and wherein the second band is an ultra-wideband (UWB) frequency band.

\* \* \* \* \*

UNITED STATES PATENT AND TRADEMARK OFFICE
CERTIFICATE OF CORRECTION

PATENT NO. : 8,456,282 B2
APPLICATION NO. : 12/387463
DATED : June 4, 2013
INVENTOR(S) : Burkart et al.

It is certified that error appears in the above-identified patent and that said Letters Patent is hereby corrected as shown below:

In the Claims:

In claim 1, column 22, line 61, delete "further comprising".

Signed and Sealed this
Twenty-third Day of July, 2013

Teresa Stanek Rea
*Acting Director of the United States Patent and Trademark Office*